US012767432B1

(12) United States Patent
Esch et al.

(10) Patent No.: US 12,767,432 B1
(45) Date of Patent: Oct. 20, 2026

(54) LOW-LEVEL WASTE RECEPTACLE

(71) Applicant: Triad National Security, LLC, Los Alamos, NM (US)

(72) Inventors: Ernst Ingo Esch, Los Alamos, NM (US); Eric John Larson, Los Alamos, NM (US); Sachi Indigo Mitchell, Los Alamos, NM (US); Julian Antonio Martinez, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 9 days.

(21) Appl. No.: 18/830,915

(22) Filed: Sep. 11, 2024

Related U.S. Application Data

(60) Provisional application No. 63/581,839, filed on Sep. 11, 2023.

(51) Int. Cl.
*B65F 1/16* (2006.01)
*B65F 1/06* (2006.01)
*B65F 1/14* (2006.01)

(52) U.S. Cl.
CPC ................ *B65F 1/163* (2013.01); *B65F 1/06* (2013.01); *B65F 1/1415* (2013.01); *B65F 1/1607* (2013.01)

(58) Field of Classification Search
CPC ........ B65F 1/163; B65F 1/06; Y10S 220/908; Y10S 220/9081; Y10S 248/907; Y10S 220/909
USPC .............................. 232/43.2; 220/908, 908.3
See application file for complete search history.

(56) References Cited

U.S. PATENT DOCUMENTS 652,331 A * 6/1900 Name not available .................... B65F 1/0006 383/34
845,484 A * 2/1907 Simpson ................. B65F 1/163 220/263
862,784 A * 8/1907 Ames ...................... B65F 1/163 220/263
1,040,565 A * 10/1912 Meyrowitz ............. B65F 1/163 220/264
1,063,503 A * 6/1913 Buckley .................. B65F 1/163 217/57
1,164,583 A * 12/1915 Drapalik ................. B65F 1/163 220/348
1,172,534 A * 2/1916 Kanizasai ............... B65F 1/163 220/263
1,195,481 A * 8/1916 Legat et al. ............ B65F 1/163 220/264
1,199,531 A * 9/1916 Davis ...................... B65F 1/163 220/264

(Continued)

*Primary Examiner* — Prince Pal
(74) *Attorney, Agent, or Firm* — ALSTON & BIRD LLP

(57) ABSTRACT

Improved low-level waste receptacles are described. An example low-level waste receptacle includes a body, the body defining a plurality of side walls and an interior portion configured to receive and retain a waste bag, a lid configured to cover a first access opening of the body and permit selective access to the interior portion of the body, an access door configured to cover a second access opening of the body, and a foot pedal pivotably connected to the lid, wherein translation of the foot pedal from a first position to a second position is configured to translate the lid from a closed position to an open position relative to the first access opening of the body, and wherein the first position of the foot pedal is configured to prevent the access door from being opened.

20 Claims, 23 Drawing Sheets

(56) References Cited

U.S. PATENT DOCUMENTS

| | | | | | | |
|---|---|---|---|---|---|---|
| 1,229,777 | A | * | 6/1917 | Oberholtzer | B65F 1/163 | 220/263 |
| 1,236,429 | A | * | 8/1917 | Hansen | B65F 1/163 | 220/263 |
| 1,308,563 | A | * | 7/1919 | Underwood et al. | B65F 1/163 | 422/301 |
| 1,364,209 | A | * | 1/1921 | Richardson | B65F 1/08 | 232/1 R |
| 1,509,798 | A | * | 9/1924 | Vance | B65F 1/163 | 49/338 |
| 1,561,444 | A | * | 11/1925 | Smith | B65F 1/163 | 220/212.5 |
| 1,625,480 | A | * | 4/1927 | Ludy | B65B 67/1216 | 312/266 |
| 2,527,449 | A | * | 10/1950 | Poole | B65B 67/1211 | 312/319.9 |
| 2,550,019 | A | * | 4/1951 | Murphy | B65F 1/141 | 248/154 |
| 2,745,676 | A | * | 5/1956 | Scott | B62B 1/10 | 248/129 |
| 2,862,683 | A | * | 12/1958 | Dunagan | B65F 1/163 | 248/147 |
| 3,065,858 | A | * | 11/1962 | Raymond | B65F 1/141 | 211/84 |
| 3,214,120 | A | * | 10/1965 | Mckee | B62B 1/264 | 211/83 |
| 3,224,717 | A | * | 12/1965 | Mott | B65F 1/141 | 211/83 |
| 3,241,750 | A | * | 3/1966 | Brighton | B65F 1/068 | 248/101 |
| 3,273,840 | A | * | 9/1966 | Oberg | B65F 1/0093 | 248/98 |
| 3,322,477 | A | * | 5/1967 | Armijo | B65F 7/00 | 248/101 |
| 3,378,323 | A | * | 4/1968 | Goldberg | B65F 1/163 | 312/319.9 |
| 3,407,941 | A | * | 10/1968 | Schmidt | B65F 1/1426 | 312/258 |
| 3,510,055 | A | * | 5/1970 | Safford | B65F 1/1426 | 312/211 |
| 3,595,507 | A | * | 7/1971 | Kurlander | B65F 1/06 | 248/97 |
| 3,602,568 | A | * | 8/1971 | Bernhardsson | B65F 1/06 | 312/274 |
| 3,817,448 | A | * | 6/1974 | Schneider | A61B 50/13 | 248/99 |
| 3,859,911 | A | * | 1/1975 | Karls | B30B 1/006 | 100/215 |
| 3,995,543 | A | * | 12/1976 | Montalbano | B30B 9/30 | 100/229 A |
| 4,150,764 | A | * | 4/1979 | Anderson | B65F 1/163 | 220/908 |
| RE30,875 | E | * | 3/1982 | Anderson | B65F 1/163 | 220/908 |
| 4,503,661 | A | * | 3/1985 | Potter | B62B 1/147 | 15/257.1 |
| 4,593,873 | A | * | 6/1986 | Nelson | B65B 67/1211 | D34/5 |
| 4,670,227 | A | * | 6/1987 | Smith | A61L 2/06 | 280/47.35 |
| 4,821,903 | A | * | 4/1989 | Hayes | B65F 1/0066 | 220/255 |
| 4,893,722 | A | * | 1/1990 | Jones | B65F 1/006 | 220/909 |
| 4,923,080 | A | * | 5/1990 | Lounsbury | B65F 1/06 | 220/908 |
| 4,953,744 | A | * | 9/1990 | Koyama | B65F 1/06 | 220/495.11 |
| 5,005,729 | A | * | 4/1991 | Hollman | B65F 1/1436 | 220/23.83 |
| 5,354,023 | A | * | 10/1994 | Meeks | B65F 1/1468 | 280/47.24 |
| 5,398,897 | A | * | 3/1995 | Sverdlik | B65F 1/141 | 248/154 |
| 5,511,682 | A | * | 4/1996 | Pace | E01H 1/006 | 220/757 |
| 5,884,556 | A | * | 3/1999 | Klepacki | B65F 1/1405 | 100/295 |
| 6,024,238 | A | * | 2/2000 | Jaros | B65F 1/163 | 220/849 |
| 6,039,200 | A | * | 3/2000 | Armor | B65F 1/163 | 220/908 |
| 6,202,922 | B1 | * | 3/2001 | Phillips | B65F 1/062 | 220/908 |
| 6,241,115 | B1 | * | 6/2001 | Delmerico | B65F 1/1426 | 220/495.08 |
| 6,267,260 | B1 | * | 7/2001 | Lyons | B65F 1/163 | 220/264 |
| 6,276,553 | B1 | * | 8/2001 | Vulcano | B65F 1/1426 | 220/908.1 |
| 6,334,542 | B1 | * | 1/2002 | Hsu | A47K 10/421 | 220/826 |
| 6,390,522 | B1 | * | 5/2002 | Rucker | B65F 1/1615 | 220/908 |
| 6,415,495 | B1 | * | 7/2002 | Delmerico | B65F 1/1426 | 264/328.8 |
| 6,505,578 | B1 | * | 1/2003 | Scott | E01H 1/1206 | 294/1.3 |
| 6,722,672 | B2 | * | 4/2004 | Cates | B62B 1/10 | 280/652 |
| 6,837,393 | B1 | * | 1/2005 | Kuo | B65F 1/1607 | 220/264 |
| 7,070,064 | B1 | * | 7/2006 | Henry | B65F 1/1623 | 220/908 |
| 7,584,705 | B2 | * | 9/2009 | Chen | A47B 21/0073 | 108/50.01 |
| 7,665,781 | B2 | * | 2/2010 | Drexler | E01H 1/1206 | 294/1.3 |
| 8,127,960 | B2 | * | 3/2012 | Li | B65F 1/10 | 220/259.2 |
| 8,157,159 | B2 | * | 4/2012 | Al-Hadhoud | B65F 1/1607 | 220/264 |
| 8,201,704 | B2 | * | 6/2012 | Finnestad | B65F 1/163 | 220/23.91 |
| 8,235,237 | B1 | * | 8/2012 | Stravitz | B65F 1/1623 | 220/495.07 |
| 8,302,916 | B2 | * | 11/2012 | Dembowiak | B65F 1/1426 | 220/495.08 |
| 8,322,561 | B2 | * | 12/2012 | Ramsey | B65D 25/2808 | 220/826 |
| 8,342,356 | B2 | * | 1/2013 | Busch | B65F 1/1426 | 220/495.08 |
| 8,393,489 | B1 | * | 3/2013 | Stravitz | B65F 1/163 | 220/264 |
| 8,505,448 | B2 | * | 8/2013 | Ko | B65F 1/163 | 100/59 |
| 8,522,993 | B2 | * | 9/2013 | Flewelling | B65F 1/163 | 220/255 |
| 8,635,838 | B2 | * | 1/2014 | Dunn | B32B 27/28 | 53/284.7 |
| 8,646,384 | B1 | * | 2/2014 | Moglia | B65F 1/16 | 100/59 |
| 8,752,723 | B2 | * | 6/2014 | Lucas | B65F 1/062 | 220/495.07 |
| 8,833,588 | B2 | * | 9/2014 | Spahmann | B65D 55/00 | 220/264 |
| 8,833,592 | B2 | * | 9/2014 | Dunn | B65F 1/0006 | 220/495.08 |
| 8,973,774 | B1 | * | 3/2015 | Stravitz | B65F 1/0026 | 220/908 |
| 8,978,917 | B2 | * | 3/2015 | Hess | B65D 43/262 | 220/263 |
| 8,984,847 | B1 | * | 3/2015 | Nguyen | B65F 1/062 | 53/567 |
| 9,027,779 | B2 | * | 5/2015 | Friedman | B65F 1/068 | 220/495.11 |
| 9,161,874 | B2 | * | 10/2015 | Pennings | B62B 3/104 | |
| 9,850,065 | B2 | * | 12/2017 | Decker | B65F 1/1615 | |

(56) References Cited

U.S. PATENT DOCUMENTS 10,053,283 B1 * 8/2018 Stravitz ............... B65B 67/1211
10,494,174 B2 * 12/2019 Muir ....................... B65F 1/163
10,543,982 B2 * 1/2020 Kral ....................... B65F 1/1646
10,875,707 B2 * 12/2020 Childress .............. B30B 9/3053
10,875,708 B2 * 12/2020 Wolfenden ................ B65F 1/12
10,961,050 B2 * 3/2021 Cohan ..................... B65F 1/163
11,643,271 B2 * 5/2023 Nelson .................... B65F 1/006 232/43.2
11,866,252 B2 * 1/2024 Chang ....................... B65F 1/06
11,981,504 B2 * 5/2024 Perez Gutierrez .... B65F 1/1426
12,084,271 B2 * 9/2024 Pavlovic ................... B65F 1/06
12,358,716 B2 * 7/2025 Andre ..................... B65F 1/068
2002/0053570 A1 * 5/2002 Marcheselli .......... B65F 1/1421 220/908
2005/0077306 A1 * 4/2005 Jackson .................... F25D 3/08 62/465
2006/0261143 A1 * 11/2006 Sola Barbarin ....... B65F 1/1426 220/908
2006/0283929 A1 * 12/2006 Lim ...................... B65F 1/1473 232/43.2
2007/0023431 A1 * 2/2007 Rouns ....................... E05C 1/12 220/908
2007/0068942 A1 * 3/2007 Smudde .................. B65F 1/163 220/23.86
2008/0199299 A1 * 8/2008 Baader ................... A61B 50/36 414/811
2008/0272119 A1 * 11/2008 Efstathiou ............... B65F 1/163 220/264
2009/0066092 A1 * 3/2009 Reeb ..................... B65F 1/1615 292/184
2009/0194579 A1 * 8/2009 Dembowiak ......... B65F 1/1415 232/43.2
2009/0230131 A1 * 9/2009 McDuffie .............. B65F 1/1607 220/23.91
2009/0250463 A1 * 10/2009 Van Risseghem ...... B65F 1/163 220/263
2012/0037637 A1 * 2/2012 Beyda ..................... B65F 1/068 220/264
2013/0113171 A1 * 5/2013 Pennings ................ B62B 3/004 206/438
2014/0209605 A1 * 7/2014 Spahmann ............. B65D 55/00 220/264
2014/0246439 A1 * 9/2014 Friedman .................. B65F 1/06 220/495.11
2015/0259139 A1 * 9/2015 Yang ....................... B65F 1/163
2016/0368707 A1 * 12/2016 King ......................... B65F 1/06
2018/0362251 A1 * 12/2018 Randall ................. B65F 1/1421
2019/0308808 A1 * 10/2019 O'Rear ................... B65F 1/068
2021/0253343 A1 * 8/2021 Downing .................. B65F 1/06
2021/0362945 A1 * 11/2021 Chang .................... B65F 1/1607
2022/0127075 A1 * 4/2022 Chang ................... B65F 1/1415
2024/0025635 A1 * 1/2024 Zak ........................... B65F 1/06
2024/0059481 A1 * 2/2024 Downing ................ B65F 1/067
2024/0383675 A1 * 11/2024 Garcia ...................... B65F 1/06
2025/0353668 A1 * 11/2025 Hampton ................ B65F 1/163

* cited by examiner

LOW-LEVEL WASTE RECEPTACLE

CROSS-REFERENCE TO RELATED APPLICATIONS

The present application claims priority to U.S. Provisional Application Ser. No. 63/581,839, titled "LOW-LEVEL WASTE RECEPTACLE," filed Sep. 11, 2023, the entire contents of which are incorporated herein by reference.

STATEMENT REGARDING GOVERNMENT SUPPORT

This invention was made with government support under 89233218CNA000001 awarded by the National Nuclear Security Administration. The government has certain rights in the invention.

TECHNOLOGICAL FIELD

Example embodiments of the present disclosure relate generally to waste receptacles and, more particularly, to an improved low-level waste receptacle for receiving, storing, and/or disposing of low-level radioactive waste.

BACKGROUND

Low-level waste receptacles are used in various facilities (e.g., laboratories, hospitals, etc.) to dispose of low-level radioactive waste securely. The inventors have identified a number of deficiencies and problems in traditional waste receptacles. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, example embodiments of the present disclosure provided herein may provide solutions to the problems and needs in the art that have not yet been fully identified, appreciated, or solved by traditional waste receptacles. In accordance with one exemplary embodiment of the present disclosure, a low-level waste receptacle is disclosed, the low-level waste receptacle comprising a body, the body defining a plurality of side walls and an interior portion; and a shelf frame disposed within the interior portion of body, wherein the shelf frame is configured for slidable extension relative to the body, and wherein a rear wall of the shelf frame and a shelf bracket extending from the rear wall of the shelf frame define a lower rim of a double-rimmed waste bag holder configured to receive and retain a portion of a waste bag.

In some embodiments, the shelf frame is configured to slidingly move throughout a range of motion between a stowed position within the interior portion of the body and an extended position. In some further embodiments, wherein the shelf frame includes a track slide extending along each of an exterior left surface and an exterior right surface of the shelf frame, and wherein an inner surface of each of a left side wall and a right side wall of the body include a complementary guide rail engaged with the respective track slides of the shelf frame. In certain embodiments, the track slides are telescoping track slides.

In some embodiments, the shelf frame comprises a load-stabilizing bracket extending from underneath a base of the shelf frame and wherein one or more caster wheels are coupled to the load-stabilizing bracket.

In some embodiments, the low-level waste receptacle further comprises a foot pedal, the foot pedal pivotably connected to a lid, wherein the lid is configured to cover a first access opening of the body and permit selective access to the interior portion of the body. In some further embodiments, a first position of the foot pedal corresponds to a closed position of the lid and wherein a second position of the foot pedal corresponds to an open position of the lid. In still further embodiments, the foot pedal is biased toward the first position. In certain embodiments, the lid is biased toward the closed position.

In some embodiments, the lid is hingedly connected to a rear side wall of the body.

In certain embodiments, the foot pedal is configured to limit sliding of the shelf frame and prevent a rear of the shelf frame from sliding past a front plane of the body.

In some embodiments, a frame is pivotably attached to a rear side wall of the body, the frame defining an upper rim of the double-rimmed waste bag holder. In some further embodiments, the frame is configured to be moveable throughout a range of motion between an open position and a closed position relative to the lower rim. In still some further embodiments, in the closed position, the frame is configured to retain a portion of the waste bag between the upper rim defined by the frame and the lower rim. In certain further embodiments, a bottom surface of the upper rim comprises a groove channel configured to receive a portion of the lower rim therein.

In some embodiments, the low-level waste receptacle of further includes a counterweight is disposed in a rear of the body.

In some embodiments, the shelf frame comprises a base, the rear wall attached to and extending from the base of the shelf frame. In some further embodiments, the base extends between a left side wall and a right side wall of the body, and wherein the base is disposed closer to a bottom portion of the body than a top portion of the body.

In some embodiments, the shelf bracket is pivotably attached to the rear wall of the shelf frame.

In some embodiments, the low-level waste receptacle further comprises a visual indicator attached to an exterior of the body, the visual indicator configured to visually indicated waste bag replacement requirements.

In accordance with another exemplary embodiment of the present disclosure, a low-level waste receptacle is disclosed, the low-level waste receptacle comprising a body, the body defining a plurality of side walls and an interior portion configured to receive and retain a waste bag, a lid configured to cover a first access opening of the body and permit selective access to the interior portion of the body, an access door configured to cover a second access opening of the body, and a foot pedal pivotably connected to the lid, wherein translation of the foot pedal from a first position to a second position is configured to translate the lid from a closed position to an open position relative to the first access opening of the body, and wherein the first position of the foot pedal is configured to prevent the access door from being opened.

In some embodiments, the access door comprises a latching mechanism and at least one side wall of the plurality of side walls comprises a corresponding receiving latching mechanism, the latching mechanism and the corresponding receiving latching mechanism configured to releasably retain the access door in a closed position.

In some embodiments, the foot pedal further defines a foot pedal extension.

In some embodiments, the low-level waste receptacle further comprises a shelf frame disposed within the interior portion of body, wherein the shelf frame is configured for slidable extension relative to the body. In some further embodiments, the low-level waste receptacle further comprises a shelf bracket extending from a rear wall of the shelf frame; and a first rim member and a second rim member hingedly attached to the shelf bracket, wherein during operation, the rim members define a closed position when the rim members engage a perimeter of the shelf bracket and an open position when the rim members are lifted away from the shelf bracket, and wherein, in the closed position, the rim members, the shelf bracket, and the rear wall of shelf frame are configured to retain a portion of the waste bag therebetween. In still some further embodiments, the rim members define hinge points proximate one another in the shelf bracket, wherein the rim members each have a substantially L-shaped cross section for portions that overlay the shelf bracket, and wherein, in the closed position, a first portion of the L-shaped cross section is parallel to and surrounds a portion of the shelf bracket and a second portion of the L-shaped cross section is perpendicular to the shelf bracket. In certain embodiments, the shelf bracket is pivotably attached to the rear wall of the shelf frame.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
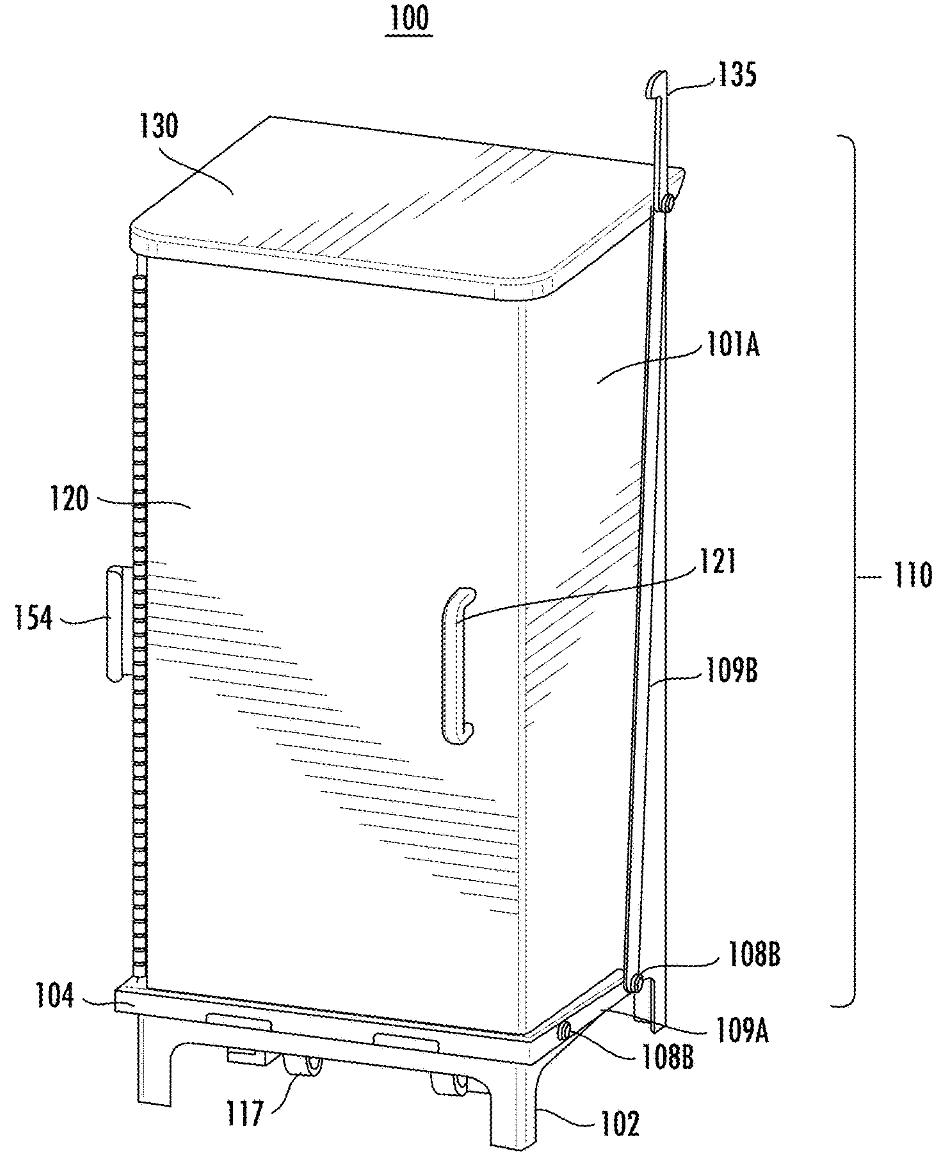
FIG. 1A illustrates an example front right perspective view of an example open low-level waste receptacle in accordance with various embodiments of the present disclosure.

Some embodiments of the present disclosure will now be described more fully hereinafter with reference to the accompanying drawings, in which some, but not all embodiments of the present disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

The figures of the current embodiments of the disclosure are not necessarily drawn to scale and are provided to illustrate some examples of the embodiments described. The figures are not to limit the scope of the present embodiment or the appended claims. Aspects of the example embodiments are described below with reference to example applications for illustration. It should be understood that specific details, relationships, and methods are set forth to provide a full understanding of the example embodiment. One of ordinary skill in the art recognize the example embodiment can be practice without one or more specific details and/or with other methods.

Overview

Low-level waste receptacles are used to dispose of low-level radioactive waste securely. Low-level waste or low-level radioactive waste is sometimes referred to as LLW and LLRW, respectively. Low-level waste does not require shielding during handling and transport. Low-level waste may typically be generated in the nuclear fuel cycle, as well as from hospitals, medical applications, research programs, academia, and industry, for example. Low-level waste may include, but is not limited to, gloves, protective clothing, laboratory supplies, swabs, irradiated tools, disposable medical items, and trash.

Typical low-level waste receptacles include a top lid as the only side to access the waste bag contained within the receptacle. Such limited access results in repetitive movements of lifting the waste bag overhead, leading to increased physical injuries. In addition, there are several points during the waste bag removal and replacement process that may cause the waste bag to rip or tear, especially in instances of overloading the capacity of the waste bag. Current waste-receptacles may also be colored similarly and only contain a sticker identifying the type of waste items to be disposed therein, such that it may be difficult for a user to determine the correct waste receptacle for waste items when holding such waste items, increasing cross-contamination risk and requiring further segregation of inappropriately placed items in future disposal. Accordingly, such conventional low-level waste receptacles suffer from significant ergonomic issues, safety issues, and other inefficiencies and the inventors have determined it would be desirable and advantageous to provide an improved low-level waste receptacle to achieve improved performance and ease of use beyond what can be achieved with current waste receptacles.

Example embodiments of the present disclosure address the various deficiencies set forth above and otherwise described herein. The low-level waste receptacle of the present disclosure may reduce potential cross-contamination. For example, a foot pedal pivotably attached to a lid may provide ease of access to the interior portion when a user's hands are full. One or more access openings in the side walls of the body which enable easier waste bag replacement also reduce instances of ripping or tearing when replacing waste bags. Some embodiments described herein include a slidable shelf frame with a base, wherein the base may support the weight of the waste bag when the waste bag is full or otherwise contains heavy items, reducing the risk of the waste bag falling through the double-rimmed waste bag holder. Such base may also support the weight of the waste bag in an extended position of the shelf frame, for example, to allow janitorial staff to perform a smear or test of the outside of the waste bag to ensure there is no contamination on the outside of the waste bag.

These characteristics as well as additional features, functions, and details are described below. Similarly, corresponding and additional embodiments are also described below. The various implementations of the improved low-level waste receptacle of the present disclosure is not limited to the radioactive waste described. Indeed, due to the improved ergonomic solutions described herein, the low-level waste receptacle of the present disclosure can instead be configured for use as a waste receptacle in any industry applications that might be of interest to a user. One of ordinary skill in the art will appreciate that the low-level waste receptacle related concepts discussed herein may be applied to a wide variety of waste receptacle applications.

Example Low-Level Waste Receptacles

FIGS. 1A-1L depict various views of an example low-level waste receptacle 100 and portions thereof in accordance with various embodiments of the present disclosure. In various embodiments, the low-level waste receptacle 100 comprises a body 110 defining a plurality of side walls 101A, 101B, 101C and an interior portion 105. For example, in the depicted embodiment, the body 110 defines a right side wall 101A, a left side wall 101B disposed opposite the right side wall, and/or a rear side wall 101C. In some embodiments, one or more legs 102 may be attached to or extend from the underside of the body 110 for respectively supporting the low-level waste receptacle 100 off of the ground or floor.

In some embodiments, as described in more detail below, the low-level waste receptacle 100 is configured for retaining a waste bag (not pictured) in the interior portion 105, the waste bag configured for receiving waste items, such as LLW items. The body 110 of the low-level waste receptacle 100 may have an open top through which such items may be inserted in the waste bag, the waste bag disposed in the interior portion 105. For example, in the depicted embodiment of FIG. 1B, a top portion of the body 110 defines a first access opening 103 permitting access to the interior portion 105. In an example use case, a user may dispose of LLW item(s) into a waste bag through the first access opening 103.

With reference to FIGS. 1A-1L, in some embodiments, the low-level waste receptacle 100 may include a lid 130 configured to cover the first access opening 103, the lid 130 permitting selective access to the interior portion 105. The lid 130 is configured to be moveable throughout a range of motion between an open position and a closed position relative to the body 110. For example, in some embodiments, the lid 130 is hingedly connected to a rear side wall 101C of the body 110 of the low-level waste receptacle 100. In some embodiments, the lid 130 is biased towards the closed position.

Figure 1B:
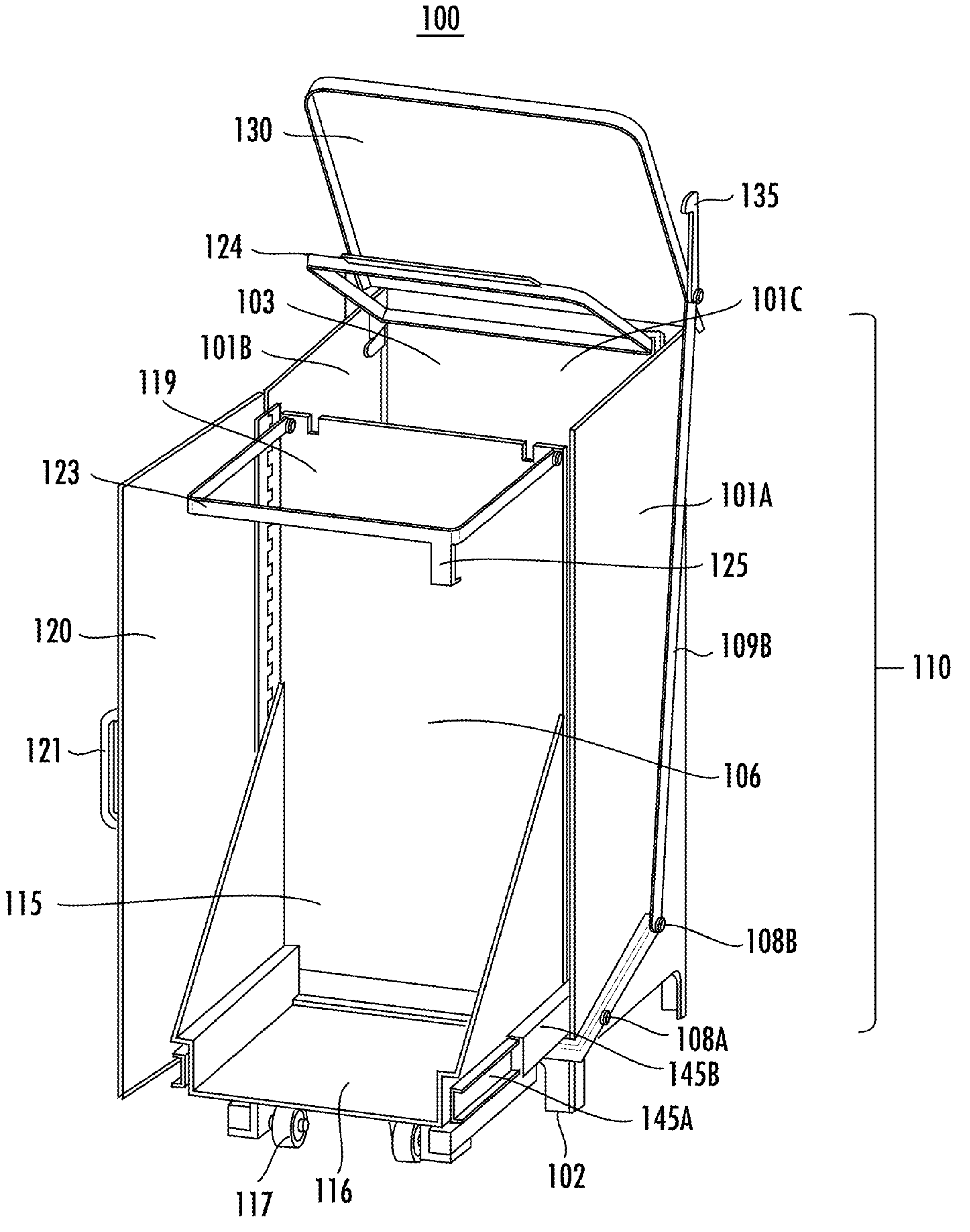
FIG. 1B illustrates an example front right perspective view of an example closed low-level waste receptacle in accordance with various embodiments of the present disclosure.
Figure 1C:
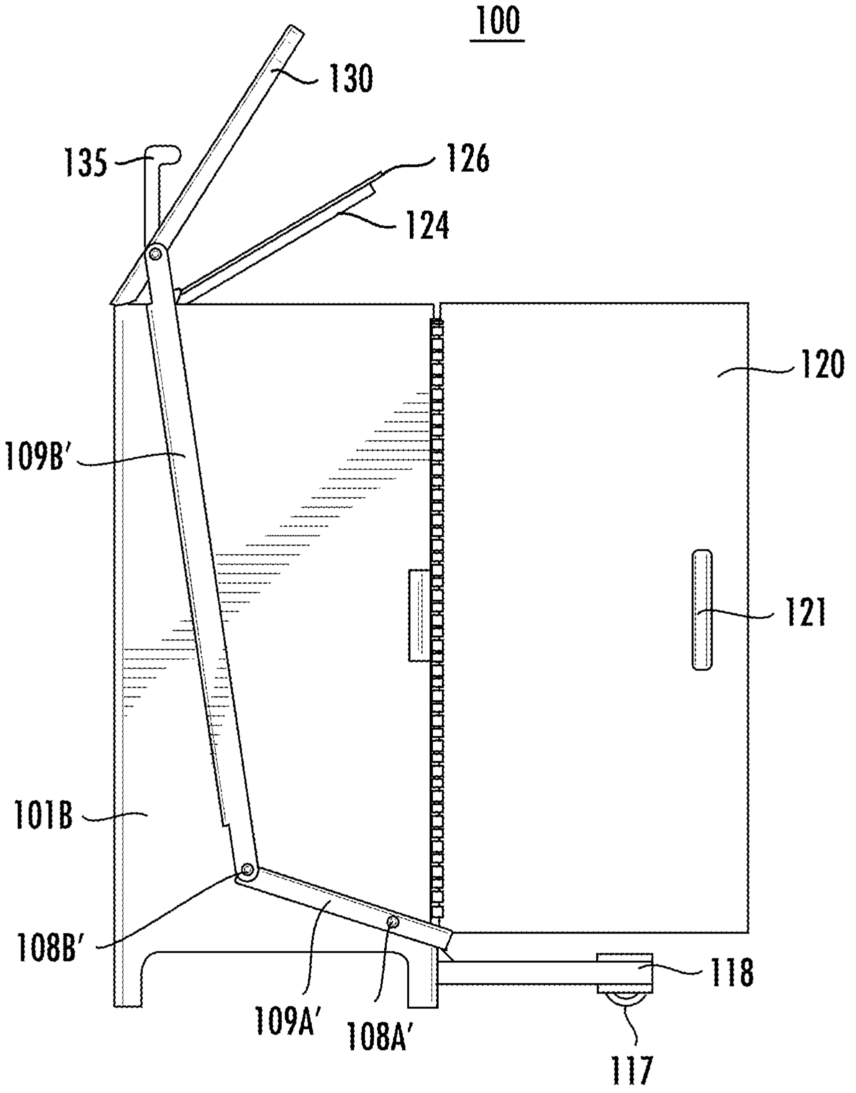
FIG. 1C illustrates an example left side view of an example open low-level waste receptacle in accordance with various embodiments of the present disclosure.
Figure 1D:
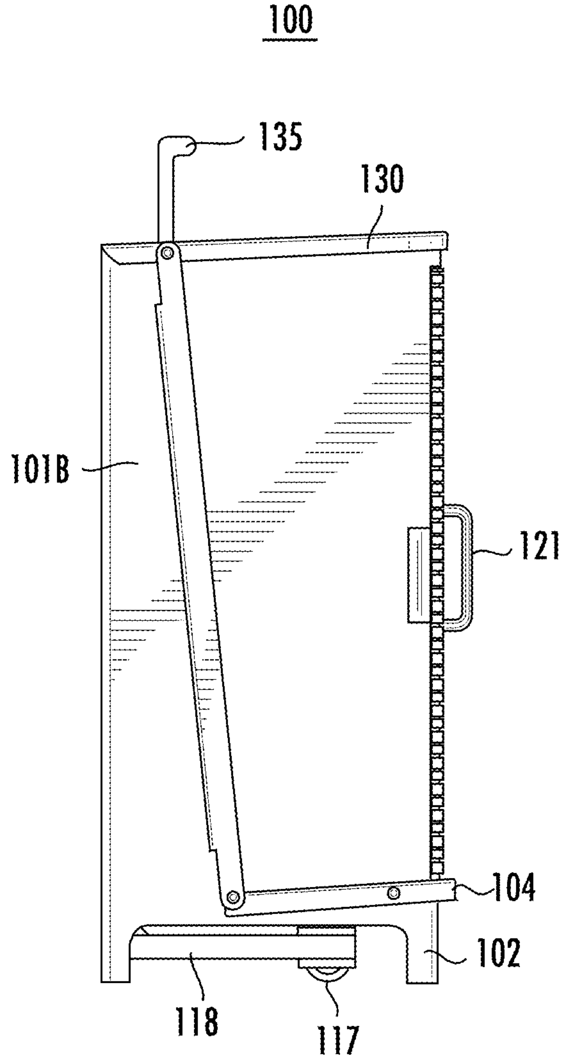
FIG. 1D illustrates an example left side view of an example closed low-level waste receptacle in accordance with various embodiments of the present disclosure.

With reference to FIGS. 1A, 1D, 1F, 1I, and 1J, in some embodiments, a foot pedal 104 may be pivotably coupled to the lid 130, allowing a user to open the lid 130 of the low-level waste receptacle 100 by pressing down or applying a downward pressure on the foot pedal 104 with his or her foot. For example, the foot pedal 104 may be pivotable from a first position (e.g., as depicted in FIGS. 1A and 1D) to a second position (e.g., as depicted in FIGS. 1B and 1C), wherein the first position of the foot pedal 104 corresponds to a closed position of the lid 130 and wherein the second position of the foot pedal 104 corresponds to an open position of the lid 130. Such foot pedal 104 reduces instances of potential cross-contamination as the user need not touch the lid 130 or any other portion(s) of the low-level waste receptacle 100 with his or her hand(s) when disposing of LLW item(s) into a waste bag through the first access opening 103.

Figure 1E:
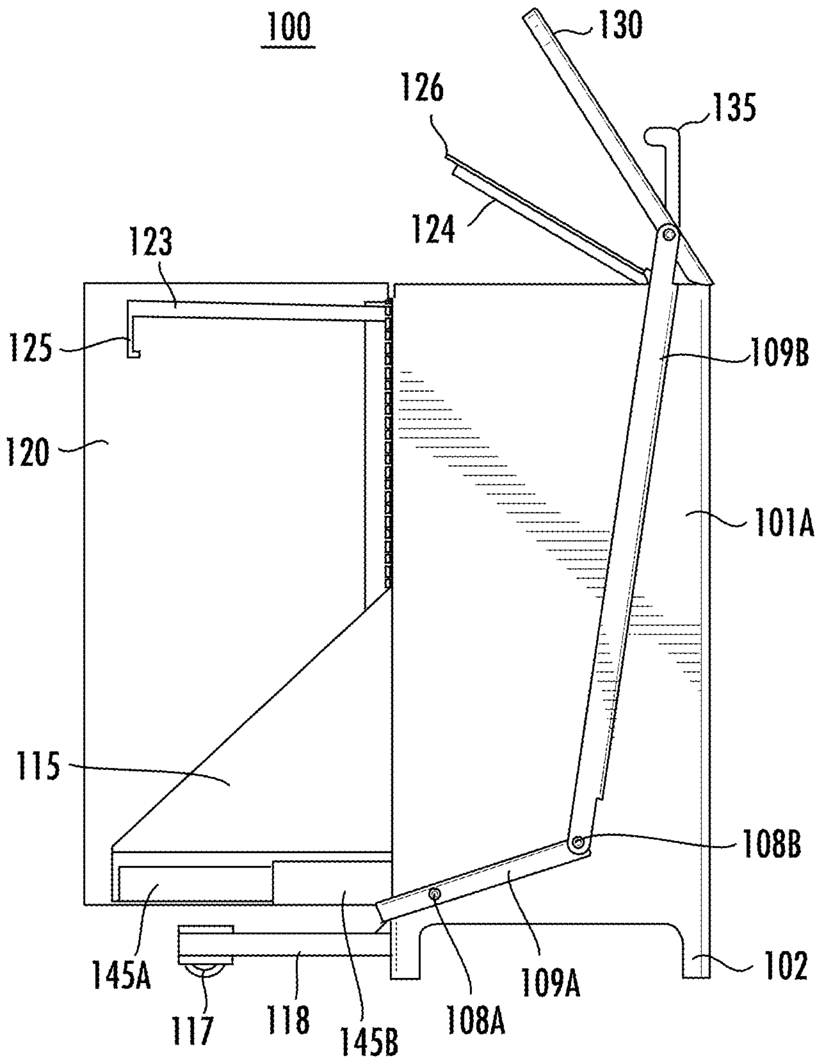
FIG. 1E illustrates an example right side view of an example open low-level waste receptacle in accordance with various embodiments of the present disclosure.
Figure 1F:
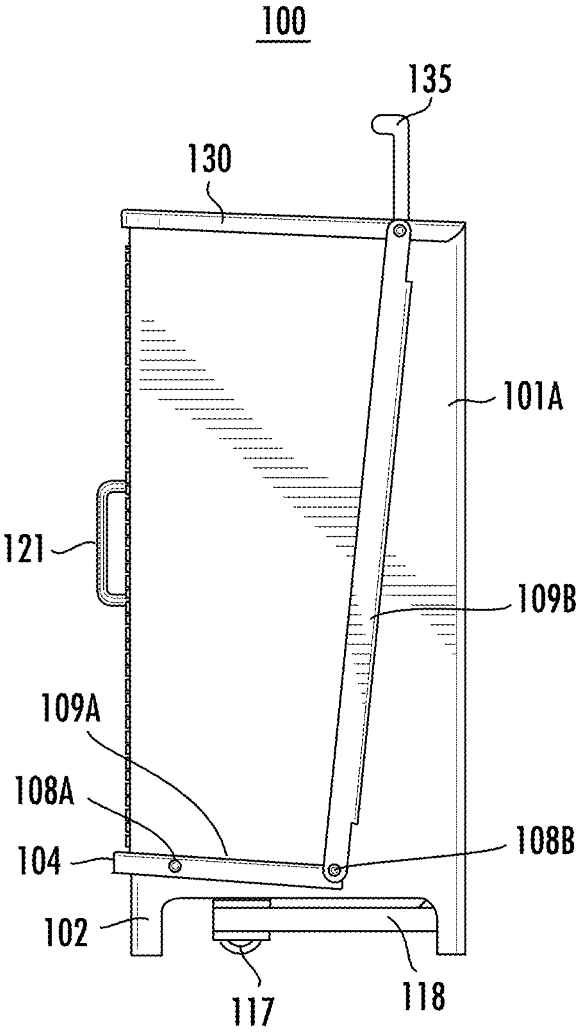
FIG. 1F illustrates an example right side view of an example closed low-level waste receptacle in accordance with various embodiments of the present disclosure.
Figure 1G:
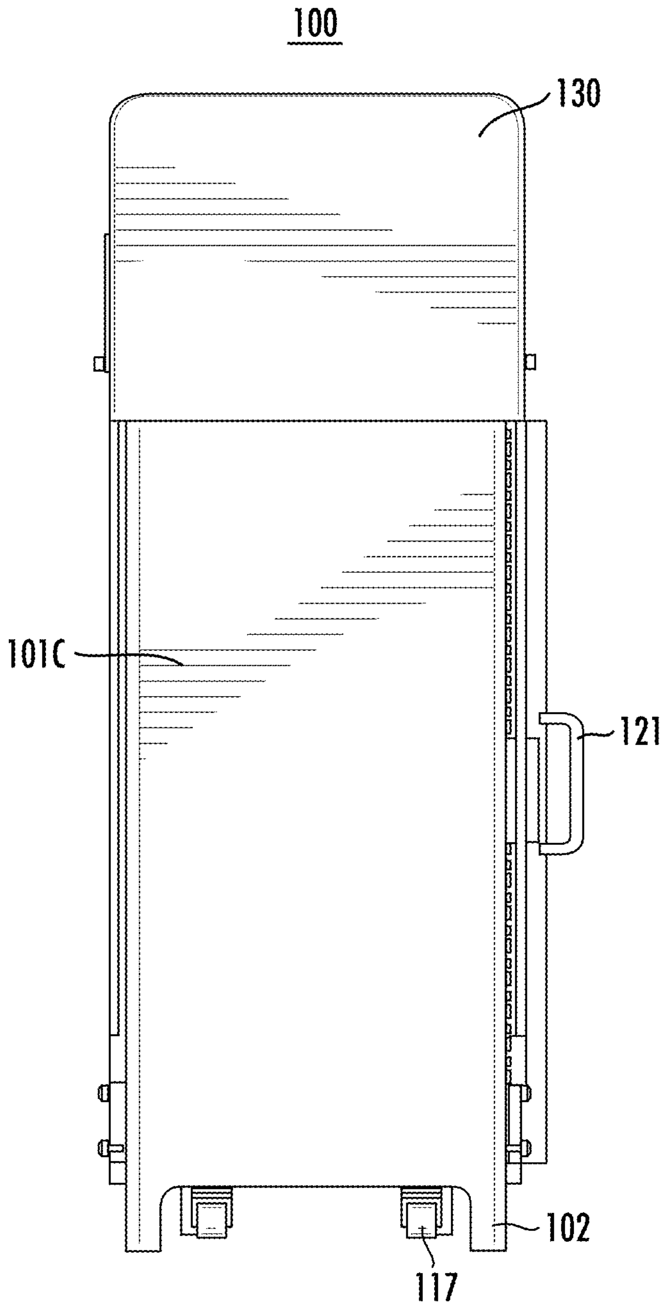
FIG. 1G illustrates an example rear view of an example open low-level waste receptacle in accordance with various embodiments of the present disclosure.
Figure 1H:
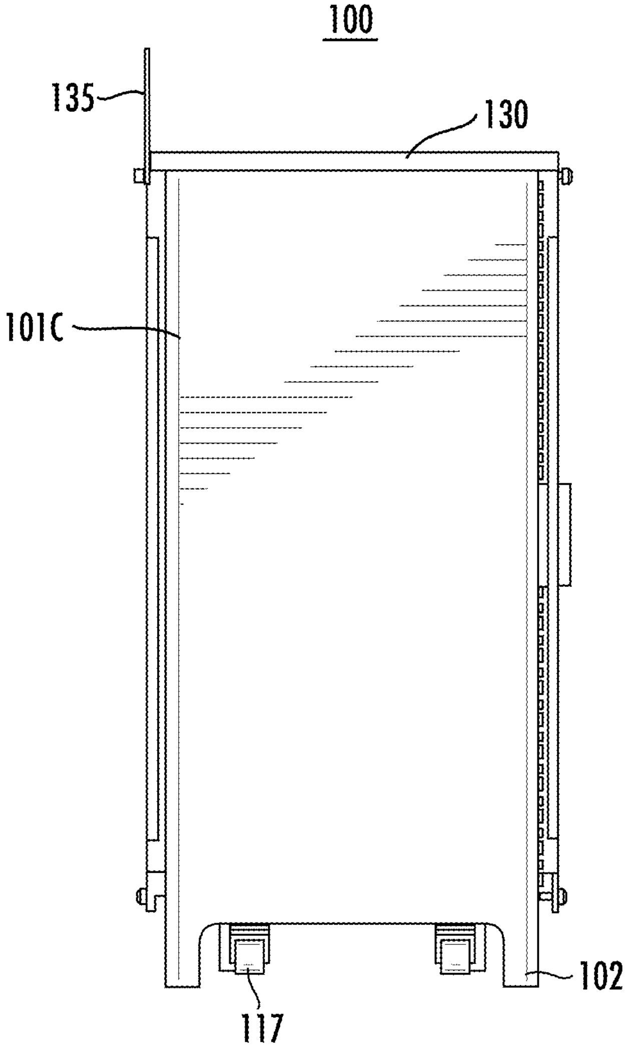
FIG. 1H illustrates an example rear view of an example closed low-level waste receptacle in accordance with various embodiments of the present disclosure.
Figure 1I:
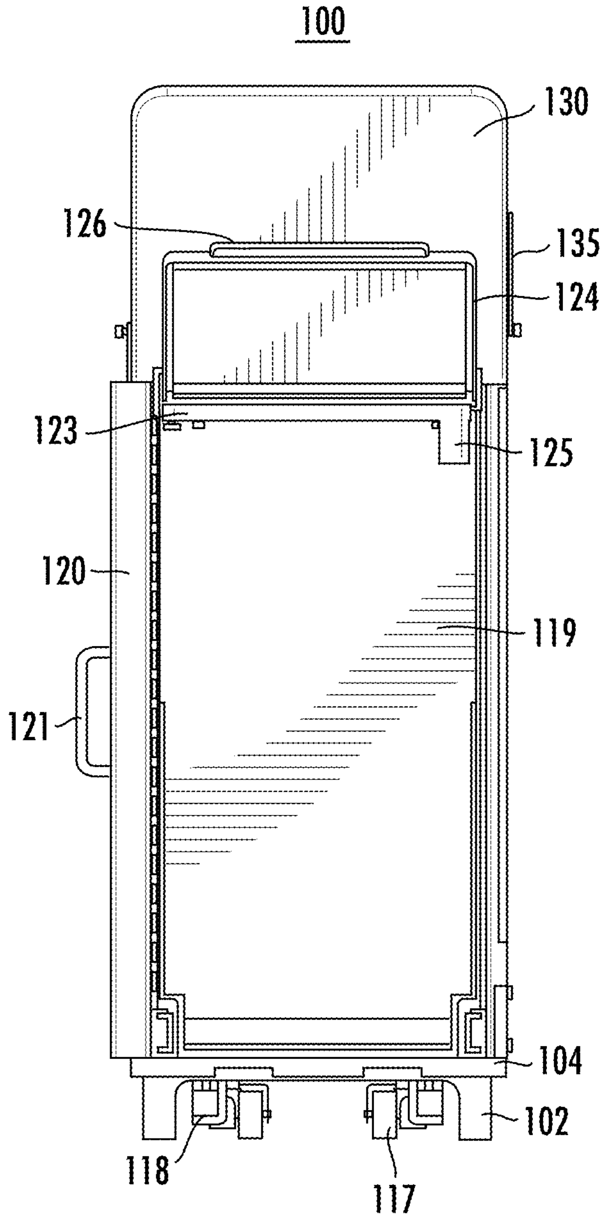
FIG. 1I illustrates an example rear view of an example open low-level waste receptacle in accordance with various embodiments of the present disclosure.
Figure 1J:
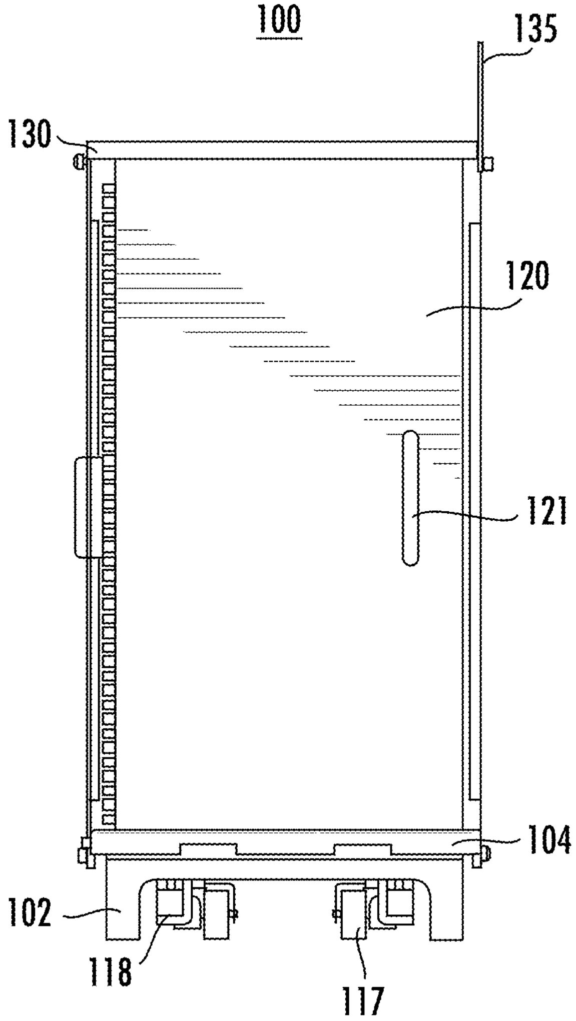
FIG. 1J illustrates an example rear view of an example closed low-level waste receptacle in accordance with various embodiments of the present disclosure.
Figure 1K:
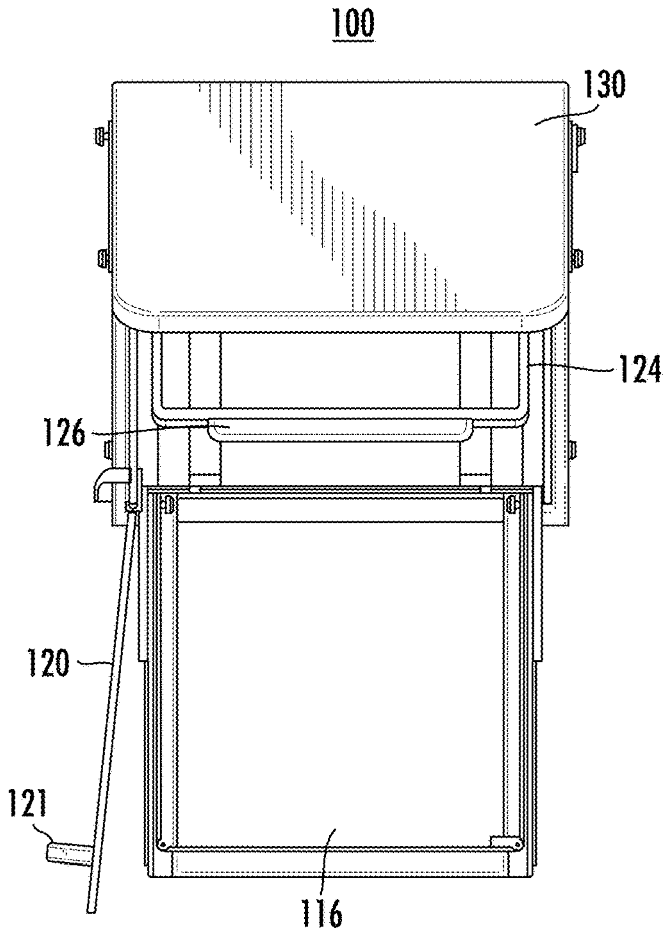
FIG. 1K illustrates an example top view of an example open low-level waste receptacle in accordance with various embodiments of the present disclosure.
Figure 1L:
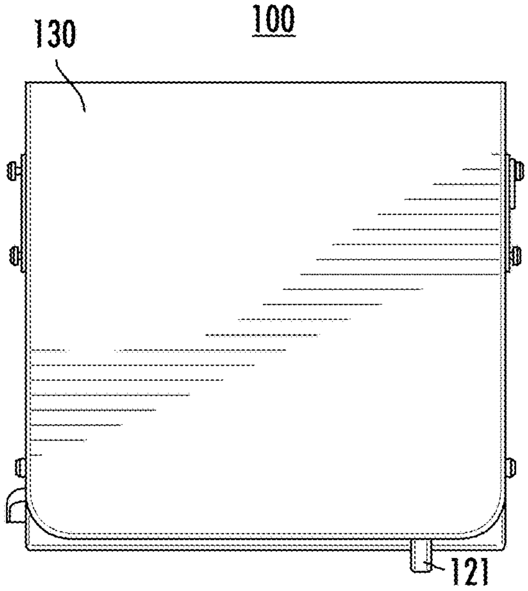
FIG. 1L illustrates an example top view of an example closed low-level waste receptacle in accordance with various embodiments of the present disclosure.

The foot pedal 104 may be pivotably coupled to the lid 130 via one or more junction points 108A, 108B. For example, in the embodiment depicted in FIGS. 1E and 1F, the foot pedal 104 is connected to at least one stationary junction point 108A via a first linkage member 109A on the exterior surface of the right side wall 101A of the body 110, the stationary junction point 108A operating as a fulcrum about which the first linkage member 109A pivots. The first linkage member 109A may be connected to an extended second linkage member 109B via at least one other junction point 108B and the opposite end of the extended second linkage member 109B may be operably attached to the lid 130, as depicted in FIGS. 1E and 1F. Accordingly, in some embodiments, pressing down on the foot pedal 104 causes the first linkage member 109A to pivot about the fulcrum at the stationary junction point 108A, which in turn causes the extended second linkage member 109B to raise up such that it is configured to operably move the lid 130 from a closed position to an open position. In some embodiments, the food pedal 104 may additionally or alternatively be pivotably coupled to the lid 130 via a second set of the first linkage member 109A', stationary junction point 108A', extended second linkage member 109B', and other junction point 108B' disposed on the exterior surface of the left side wall 101B of the body 110, as depicted in FIGS. 1C and 1D.

The body 110 may further have an open side through which a waste bag may be installed, removed, and/or accessed in the interior portion 105 of the low-level waste receptacle 100. For example, in the embodiment depicted in FIG. 1B, the body 110 of the low-level waste receptacle 100 may further define a second access opening 106 (e.g., in place of a front side wall) permitting access to the interior portion 105. In various embodiments, the low-level waste receptacle 100 may include an access door 120, the access door 120 configured to cover the second access opening 106 and permit selective access to the interior portion 105 via the second access opening 106. The access door 120 may be configured to be moveable throughout a range of motion between an open position and a closed position relative to the body 110 of the low-level waste receptacle 100. In some embodiments, one or more door stops 154 may be included to ensure that the access door 120 does not open too wide.

In some embodiments, the access door 120 is hingedly connected to a side wall 101 (e.g., left side wall 101B, right side wall 101A) of the body 110 of the low-level waste receptacle 100. In still further embodiments, the access door 120 is biased towards the closed position. For example, in some embodiments, the access door 120 may include one or more magnet(s), biasing the access door 120 in the closed position. The access door 120 may further include one or more handles 121, enabling the user to grasp the handle 121 and open the access door 120. Although depicted as being disposed on the right hand side of the access door 120 in FIGS. 1C and 1J, a handle 121 may be disposed on one or both sides of the access door 120, allowing for left-hand dominant and/or right-hand dominant openings. Although depicted in the front of the body 110 of the low-level waste receptacle 100 in FIGS. 1B, the present disclosure contemplates various arrangements such that the second access opening 106 and the access door 120 may be disposed as part of or in place of any side wall 101 of the body 110. Additionally or alternatively, the body 110 may include a third access opening (not pictured) and a second access door (not pictured) configured to cover the third access opening and permit selective access to the interior portion 105 via the third access opening. For example, the second access opening 106 and the third access opening, with associated access door 120 and second access door, respectively, may be disposed on opposing sides of the body 110 of the low-level waste receptacle 100 (e.g. allowing for left-hand dominant and right-hand dominant opening).

In some embodiments, a first position of the foot pedal 104 is configured to prevent the access door 120 from being opened. For example, in the example embodiment depicted in FIGS. 1A, 1D, 1F, and 1J, when the lid 130 is closed and the foot pedal 104 is disposed in the first position, the foot pedal 104 may extend across a lower portion of the access door 120, restricting movement of the access door 120 and preventing the access door 120 from being opened. When downward pressure is applied to the foot pedal 104, the foot pedal 104 is adjusted to the second position such that it is below the access door 120 and no longer blocks or prevents the access door 120 from being opened. In a non-limiting example use case, a user may then grasp the handle 121 of the access door 120 and open the access door 120 to access the interior portion 105. In some embodiments, the open access door 120 blocks or prevents the foot pedal 104 from returning to the first position. In some embodiments, the foot pedal 104 is biased towards the first position such that once the access door 120 is closed and no longer preventing the foot pedal 104 from returning to the first position, the foot pedal 104 may return to the first position.

With reference to FIGS. 1B and 1E, in various embodiments, a shelf frame 115 is disposed within the interior portion 105 of the low-level waste receptacle 100. In some embodiments, the shelf frame 115 may comprise a base 116. The base 116 may extend between the left side wall 101B and the right side wall 101A of the body 110 of the low-level waste receptacle 100 and may be disposed closer to a bottom portion of the body 110 than the top portion of the body 110.

In some embodiments, the shelf frame 115 is configured for slidable extension relative to the body 110. For example, in some embodiments, the shelf frame 115 may be configured to slidingly move throughout a range of motion between a stowed position within the interior portion of the body 110, as depicted in FIGS. 1A, 1D, 1F, and 1J, and an extended position, as depicted in FIGS. 1B, 1C, 1E, and 1K. In still further embodiments, the shelf frame 115 may include a sliding mechanism configured to cause translation of the shelf frame 115 between the stowed position and the extended position. For example, in one embodiment, the shelf frame 115 may include a track slide 145A extending along each of an exterior left surface and an exterior right surface of the shelf frame 115, the track slide 145A allowing the shelf frame 115 to slidingly move relative to the body 110. In various embodiments, the inner surfaces of each of the left side wall 101B and the right side wall 101A of the body 110 may include a complementary guide rail 145B engaged with the respective track slides 145A of the shelf frame 115 and configured to enable the shelf frame 115 to slidingly move between the stowed position within the interior portion 105 and the extended position. In such embodiments, the track slides 145A may be telescoping track slides, such that when the shelf frame 115 is in the stowed position, the telescoping track slides may be configured to nest within the complementary guide rails 145B of the body 110. In other embodiments, the track slides 145A are roller-bearing slides configured to engage with the complementary guide rails 145B. In still other embodiments, the track slides 145A may each comprise one or more track wheels configured to engage with the complementary guide rail(s) 145B. In still further embodiments, the track slides 145A and the guide rails 145B may define complementary shapes.

Figure 1M:
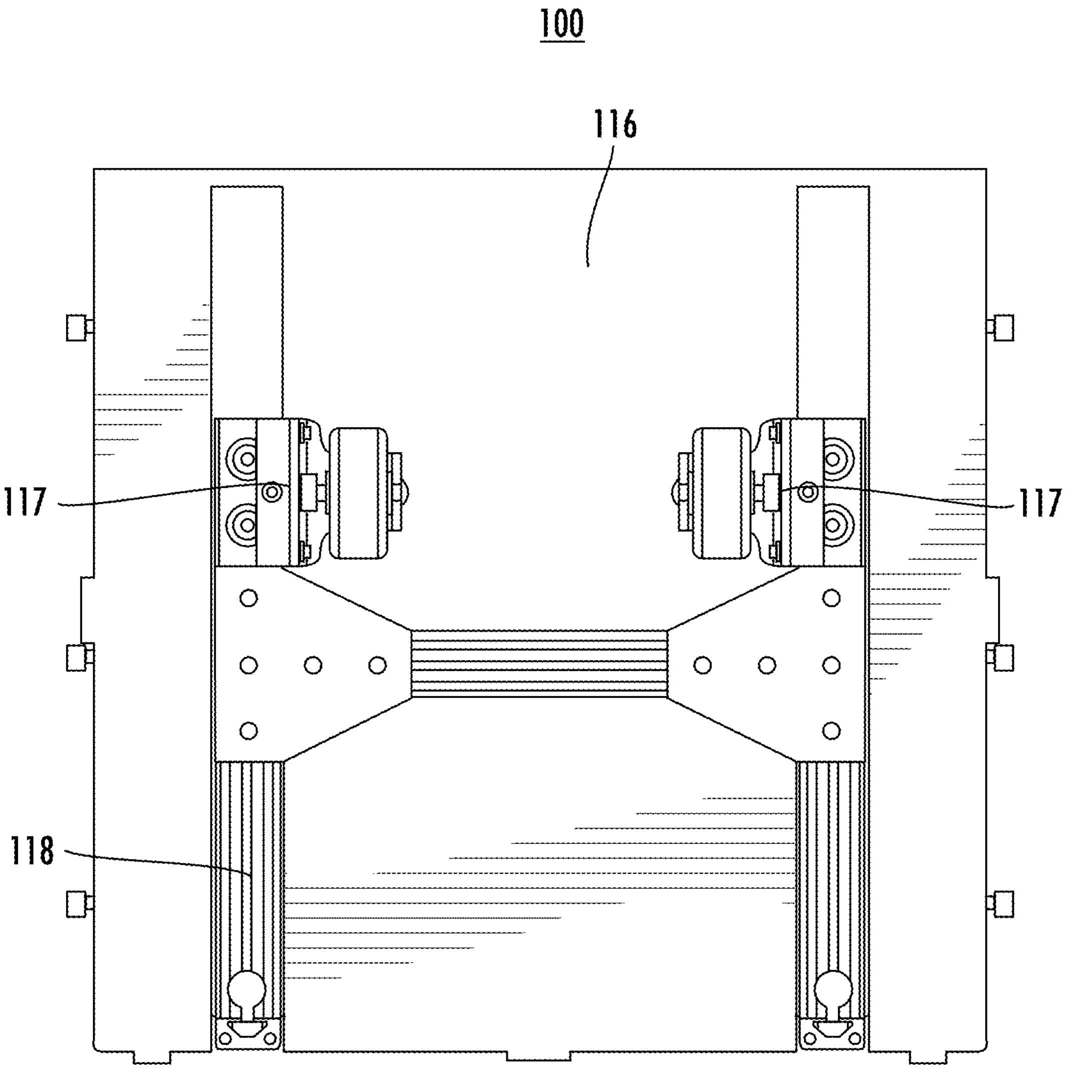
FIG. 1M illustrates an example bottom view of an example low-level waste receptacle in accordance with various embodiments of the present disclosure.
Figure 2A:
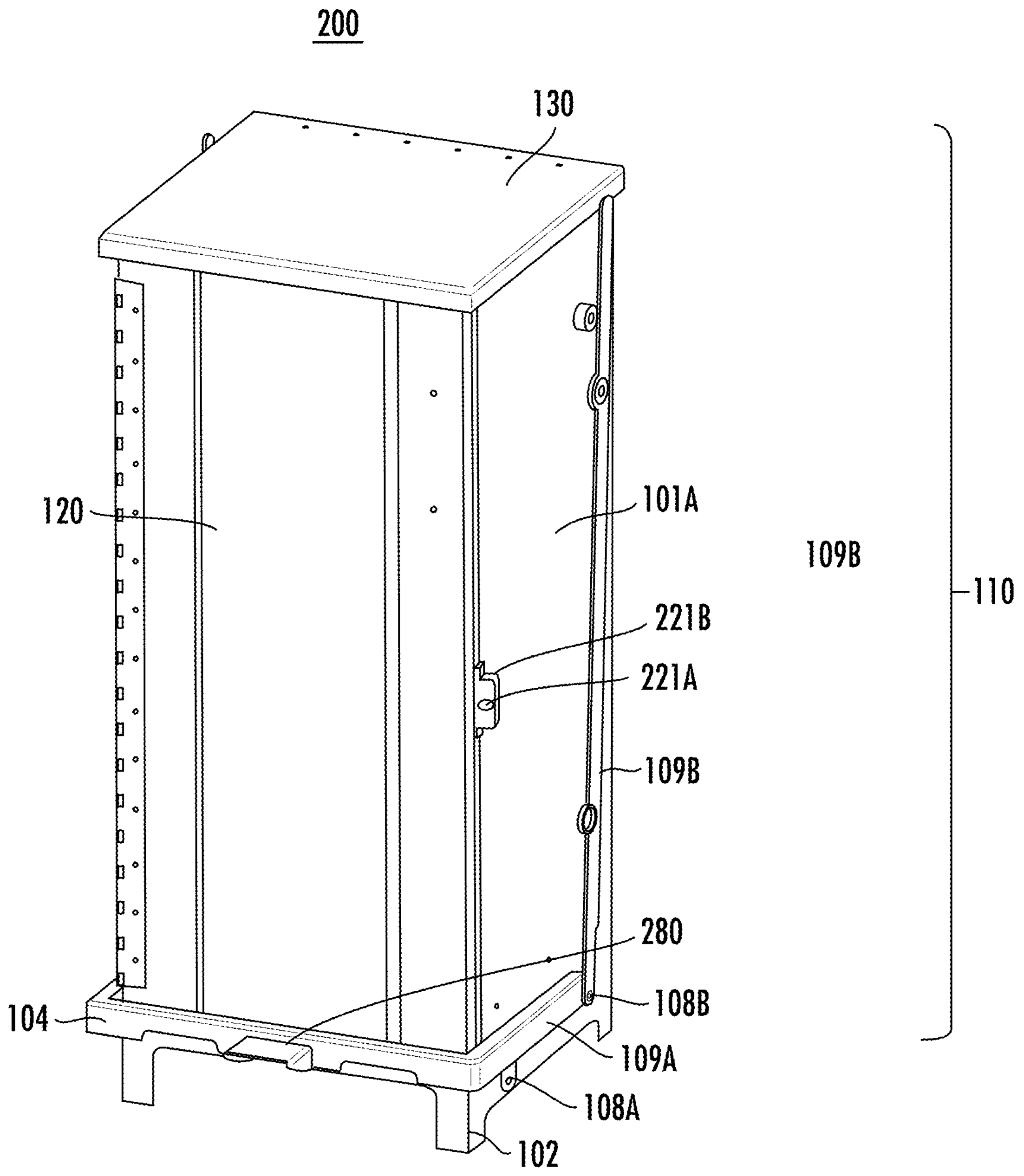
FIG. 2A illustrates an example front right perspective view of another example closed low-level waste receptacle in accordance with various embodiments of the present disclosure.
Figure 2B:
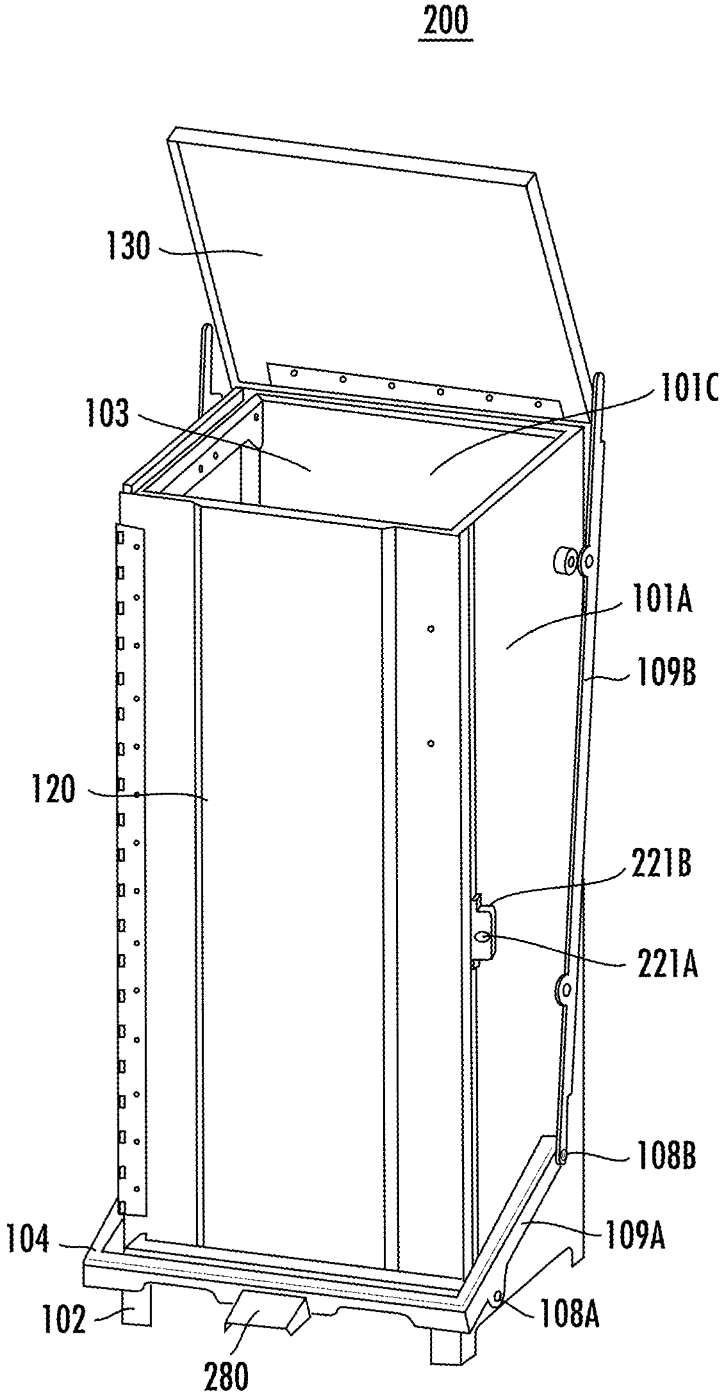
FIGS. 2B-2F illustrate example front right perspective views of another example open low-level waste receptacle in accordance with various embodiments of the present disclosure.
Figure 2C:
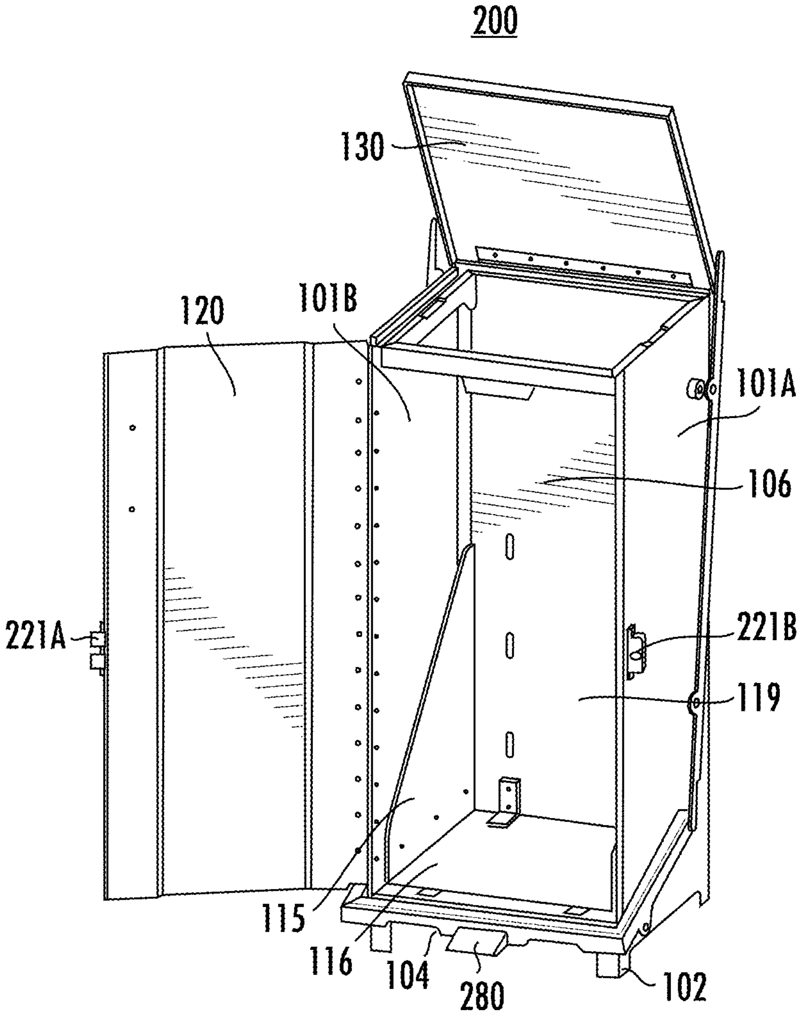
Figure 2D:
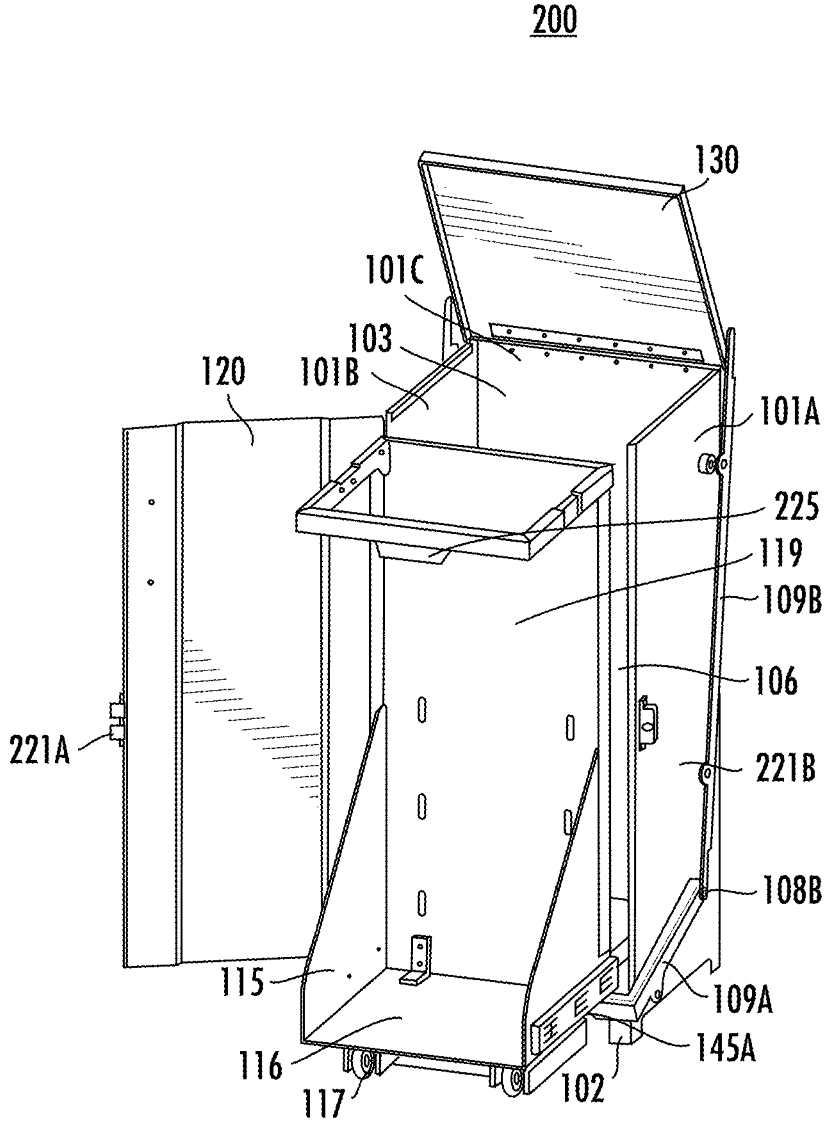
Figure 2E:
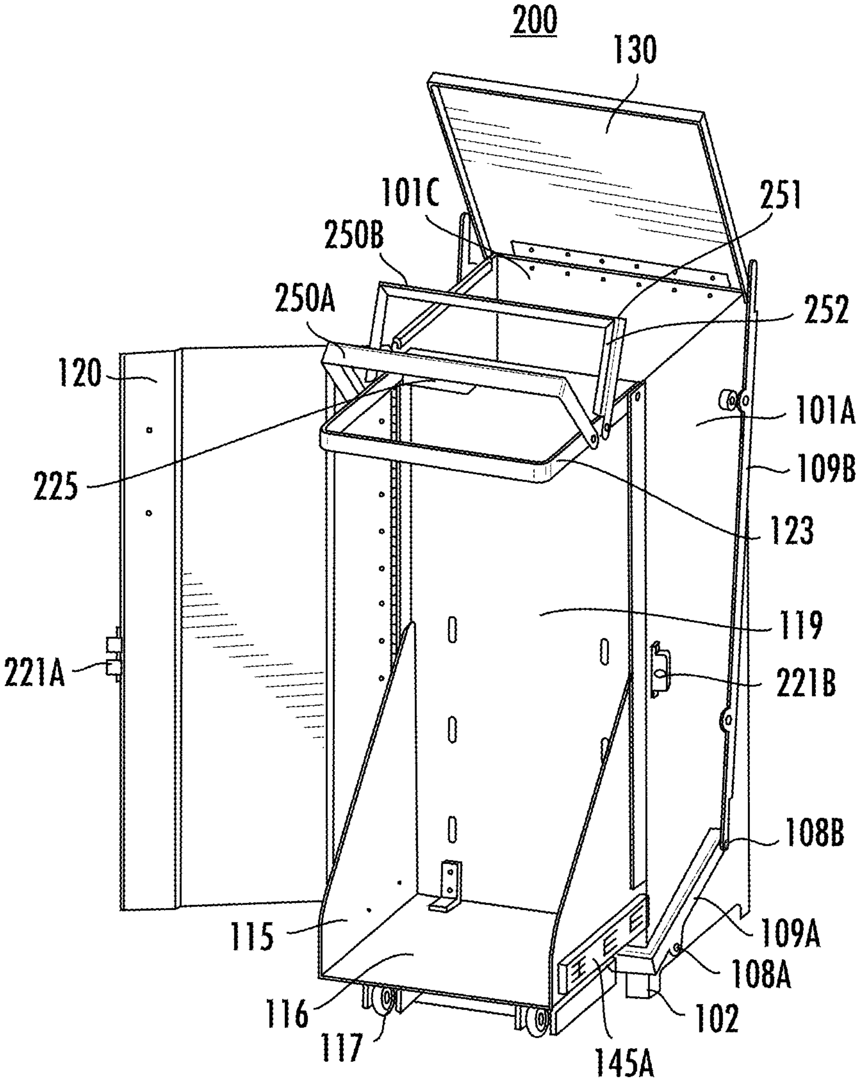
Figure 2F:
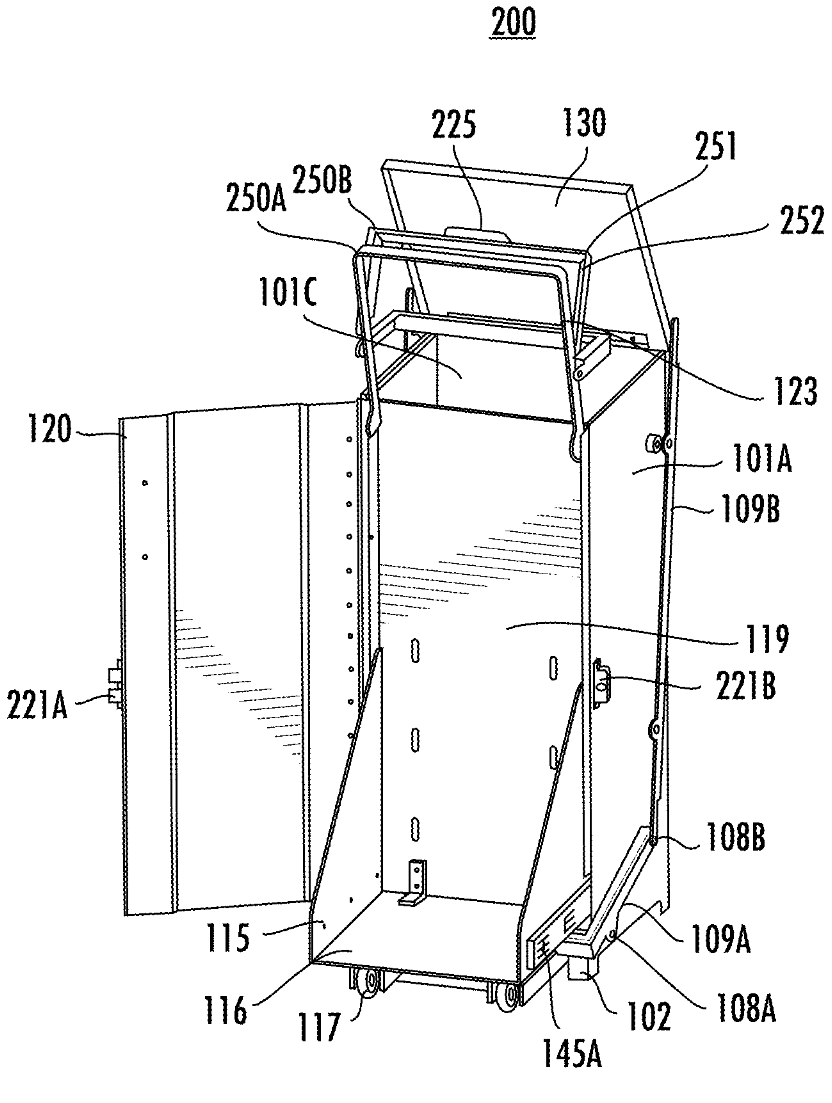
Figure 2G:
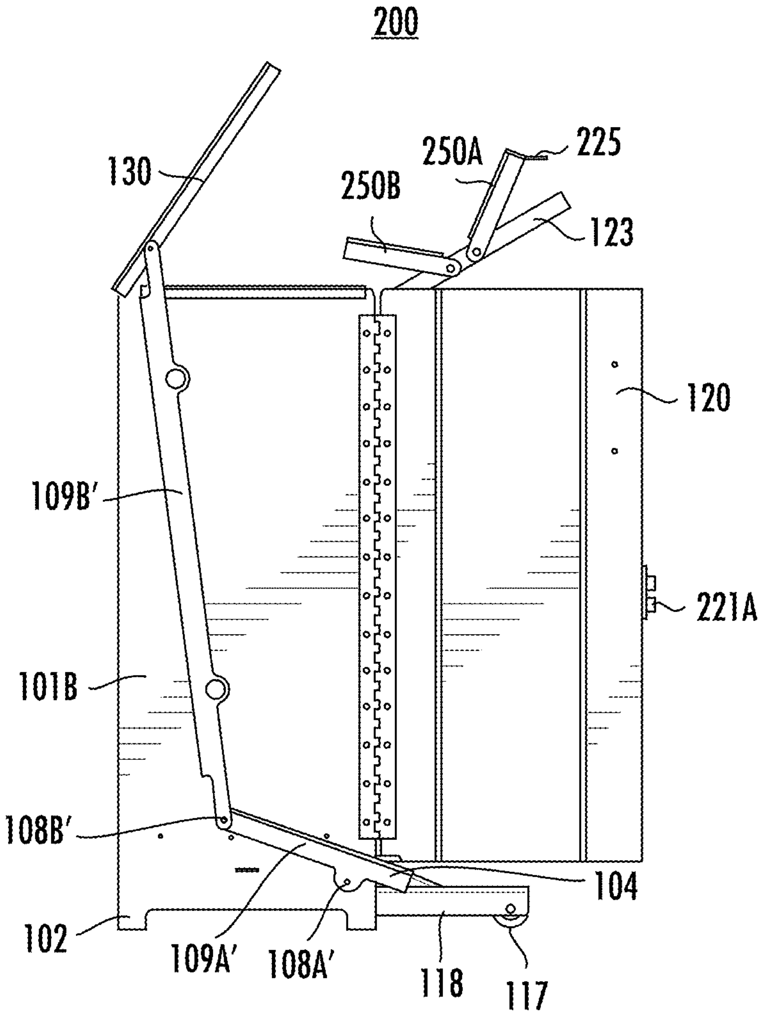
FIG. 2G illustrates an example left side view of another example open low-level waste receptacle in accordance with various embodiments of the present disclosure.
Figure 2H:
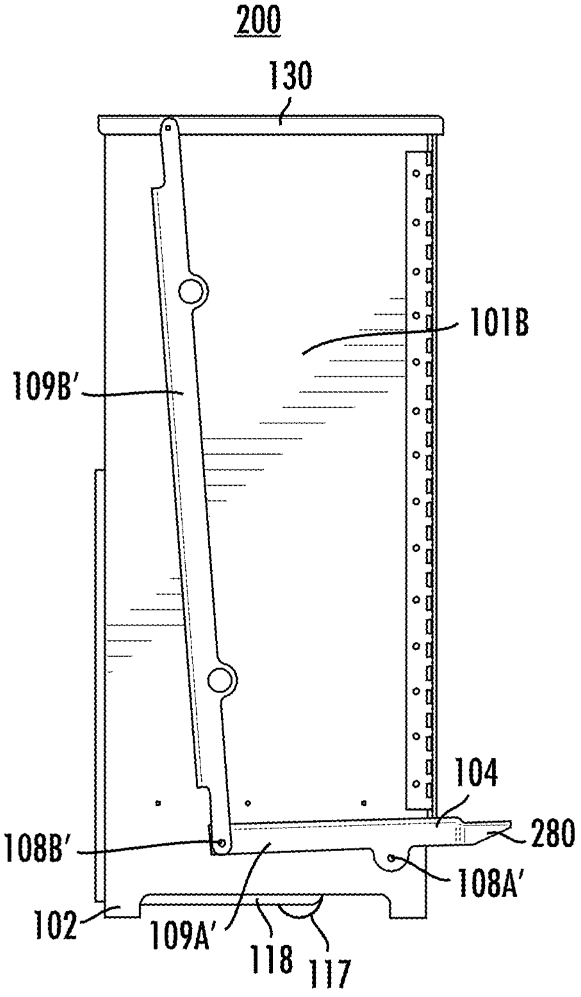
FIG. 2H illustrates an example left side view of another example closed low-level waste receptacle in accordance with various embodiments of the present disclosure.
Figure 2I:
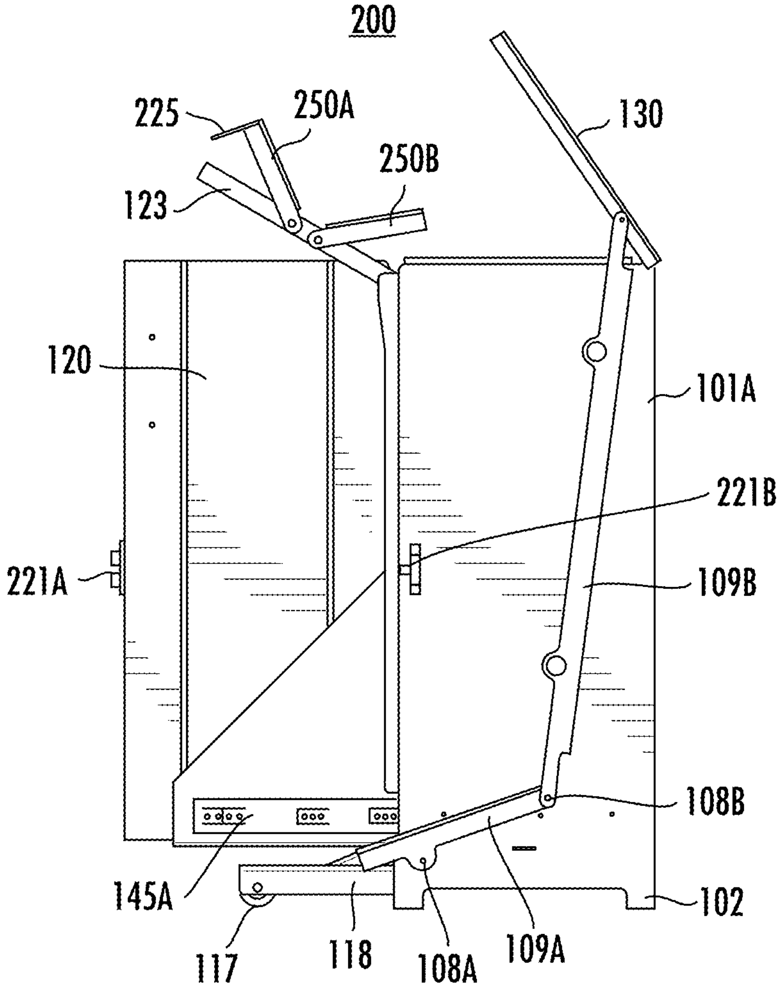
FIG. 2I illustrates an example right side view of another example open low-level waste receptacle in accordance with various embodiments of the present disclosure.
Figure 2J:
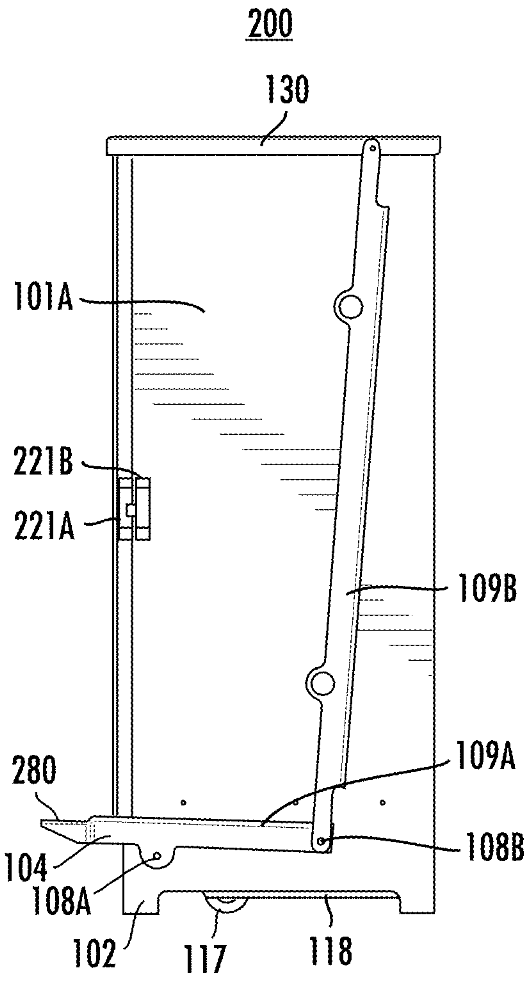
FIG. 2J illustrates an example right side view of another example closed low-level waste receptacle in accordance with various embodiments of the present disclosure.
Figure 2K:
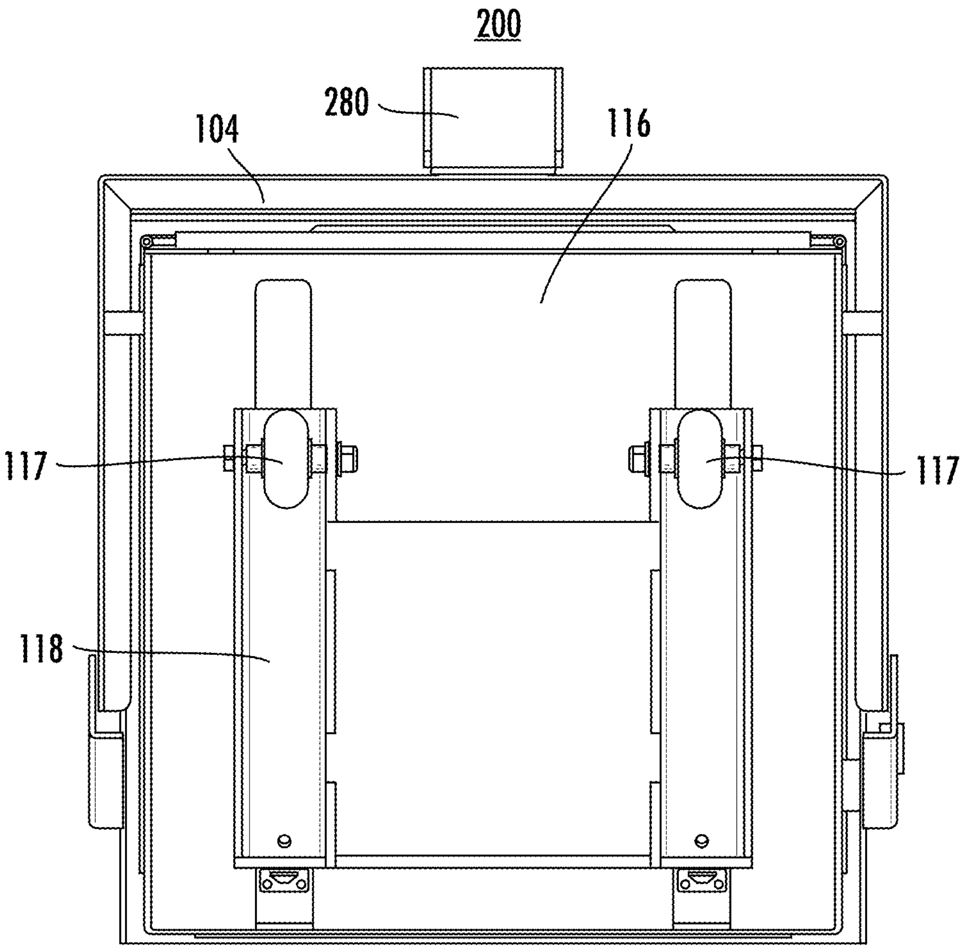
FIG. 2K illustrates an example bottom view of another example low-level waste receptacle in accordance with various embodiments of the present disclosure.

In some embodiments, as depicted in FIG. 1M, the shelf frame 115 may further include one or more wheels 117 (e.g., caster wheels) coupled to a bottom surface of the base 116, providing the shelf frame 115 with load-stabilizing support as the shelf frame 115 slidingly moves between the stowed position and the extended position. In still other embodiments, additionally or alternatively, the shelf frame 115 may include a load-stabilizing bracket 118 extending from underneath the base 116, as depicted in FIGS. 1C-1F and 1M, the one or more wheels 117 (e.g., caster wheels) coupled to the load-stabilizing bracket 118. Such load-stabilizing bracket 118 may reduce or prevent tipping of the low-level waste receptacle 100 when a waste bag disposed therein is full or weighed down and the shelf frame 115 is in the extended position. Moreover, janitorial staff may be required to perform a smear or test of the outside of the waste bag to ensure there is no contamination on the outside of the waste bag. Such shelf frame 115 and/or load-stabilizing bracket 118 is configured to support the weight of the waste bag while the shelf frame 115 is in the extended position, making it easier for the janitorial staff to perform such smear test(s).

In some embodiments, the foot pedal 104 may configured to be disposed below the base 116 of the shelf frame 115 and above the load-stabilizing bracket 118 in the second position, as depicted in FIGS. 1B, 1C, 1E, and 1I. In such embodiments, the foot pedal 104 may be configured to operate as an engaging projection such that the foot pedal 104 is configured to limit the sliding of the shelf frame 115 and prevent the rear of the shelf frame 115 from sliding past a front plane of the body 110 of the low-level waste receptacle 100. For example, as depicted in FIGS. 1C and 1E, the foot pedal 104 may be configured to engage a first generally vertical extension of the load-stabilizing bracket 118.

In some embodiments, the shelf frame 115 may include at least a rear wall 119, the rear wall 119 attached to and extending from the base 116 of the shelf frame 115. A shelf bracket 123 may be attached to and extend generally horizontally from the rear wall 119 of the shelf frame 115, the shelf bracket 123 and rear wall 119 together defining a lower rim of a double-rimmed waste bag holder configured to receive and retain a portion of a waste bag. In some embodiments, the shelf bracket 123 may be pivotably attached to the rear wall 119 of the shelf frame 115 such that it is configured to pivot upward from the generally horizontal base position. In an example use case, such pivoting may allow a user to pivot the shelf bracket 123 up and out of the way of a full waste bag when attempting to remove the waste bag from the shelf frame 115. Additionally or alternatively, in some embodiments, the shelf bracket 123 may further include or define a hook 125 or other extension to which a user can grasp and pull the shelf frame 115 from the stowed position to the extended position and push back into the stowed position.

In some embodiments, a frame 124 may be pivotably attached to the rear side wall 101C of the body 110, the frame 124 defining an upper rim of the double-rimmed waste bag holder, wherein the frame 124 is configured to be moveable throughout a range of motion between an open position and a closed position relative to the lower rim (e.g., defined by the shelf bracket 123 and the rear side wall 101C of the shelf frame 115). In a non-limiting example use case, a user may sufficiently overlay or fold the walls at the opening of the waste bag over the lower rim and lower the upper rim, the upper rim thereby engaging the corresponding lower rim of the double-rimmed waste bag holder to secure the waste bag therebetween. In some embodiments, the bottom surface of the upper rim may include a groove channel 124A configured to receive the lower rim to further secure the waste bag therebetween.

In some embodiments, the upper rim defined by the frame 124 may further include an extension or one or more gripping elements (e.g., an upper rim handle 126) for a user to grasp or may apply pressure thereto to in order to pivotably move the upper rim. For example, lifting the upper rim handle 126 raises the upper rim, separating the upper rim from the lower rim. Having pivotably disengaged the upper rim from the corresponding lower rim, the user may then remove the waste bag through the center of an opening defined by the lower rim. In the depicted embodiment of FIGS. 1C, 1E, 1I, and 1K, the gripping element or upper rim handle 126 is disposed on a front portion of the upper rim, the front portion of the upper rim (i.e., frame 124) disposed opposite of the rear side wall 101C of the body 110.

With further reference to FIGS. 1A-1F and 1H-1J, in various embodiments, a visual indicator 135 may be attached to or otherwise visible from an exterior of the body 110 of the low-level waste receptacle 100. For example, the visual indicator 135 may be a mail flag or other indicator that may be visible at a distance from the low-level waste receptacle 100. In a non-limiting use case example, a mail flag may be attached to the exterior of the body 110, wherein when lowered or placed in the lower position by a user, the mail flag signals that the waste bag need not be changed and when raised or placed in the raised position by a user, the mail flag signals that the waste bag is full and/or needs to be changed/replaced. This may allow a user or janitorial staff member to view the waste bag replacement requirements of a low-level waste receptacle 100 from a distance (e.g., such as through a window of a door into a laboratory without having to enter the laboratory).

FIGS. 2A-2K depict various views of another embodiment of the low-level waste receptacle described herein. The embodiment of FIGS. 2A-2K includes many of the same components as described with respect to FIGS. 1A-1M, such as the side walls 101A, 101B, 101C; the leg(s) 102; the first access opening 103; the foot pedal 104; the interior portion 105; the second access opening 106; the junction points 108A, 108A', 108B, 108B; the linkage members 109A, 109A', 109B, 109B'; the body 110; the shelf frame 115; the base 116; the wheel(s) 117; the load-stabilizing bracket 118; the rear wall 119; the access door 120; the shelf bracket 123; the lid 130; the track slides 145A; the complementary guide rail(s) 145B;

However, as depicted in FIGS. 2A-2K, the foot pedal 104 may further include or define a foot pedal extension 280 for ease of use of the user to press down or apply a downward pressure on the foot pedal 104 with his or her foot. In each of the embodiments of FIGS. 1A-1M and 2A-2K, the function of the foot pedal 104 is the same and any of the foregoing differences between embodiments may be combined and/or substituted for each other.

As further depicted in FIGS. 2A-2G, 2I, and 2J, the access door 120 may include a latching mechanism 221A that interacts with or otherwise engages with a receiving latching mechanism 221B of the body 110 (e.g., disposed on an exterior surface of a side wall 101). In operation, the latching mechanisms 221A, 221B function to releasably retain the access door 120 in a closed position. In some embodiments, the latching mechanisms 221A, 22B together form a spring-loaded latch. For example, a ball bearing that presses in a cylinder against a spring being compressed and pushing back out into the groove part of the latch to secure the access door 120. The configuration of the latching mechanisms 221A, 221B is not limited to the illustrated embodiments, and can be any viable mechanism that produces the desired function of releasably retaining the access door 120 in the closed position.

As further depicted in FIGS. 2C-2G and 2I, in some embodiments, a first rim member 250A and a second rim member 250B may hingedly attach to the shelf bracket 123.

The first rim member 250A and the second rim member 250B each define a closed position wherein they engage a perimeter of the shelf bracket 123 and an open position wherein they are lifted away from the shelf bracket 123. As further depicted in FIGS. 2B-2G and 2I, in some embodiments, the rim members 250A, 250B, define hinge points proximate one another in the shelf bracket 123 and the rim members 250A, 250B each have a substantially L-shaped cross section for the portions that overlay the shelf bracket 123, wherein, in the closed position, a first portion 251 of the L-shaped cross section is parallel to and surrounds a portion of the shelf bracket 123, and a second portion 252 of the L-shaped cross section is perpendicular to the shelf bracket 123, the shelf bracket 123 supporting the second portion 252 of the L-shaped cross section when the rim members 250A, 250B are in the closed position. Such configuration of the shelf bracket 123 and rim members 250A, 250B defines a waste bag holder, wherein the rim members 250A, 250B are configured to be moveable throughout a range of motion between the open position and the closed position relative to the shelf bracket 123 and the rear side wall 101C of the shelf frame 115. In a non-limiting example use case, a user may sufficiently overlay or fold the walls at the opening of the waste bag over the shelf bracket 123 and the rear side wall 101C while the rim members 250A, 250B are in the open position (e.g., raised or lifted away from the shelf bracket 123) and lower one or both of the rim members 250A, 250B into the closed position, the rim members 250A, 250B thereby engaging the corresponding shelf bracket 123 and rear side wall 101C of the waste bag holder to secure the waste bag therebetween. The substantially L-shaped cross sections of the rim members 250A, 250B that overlay the shelf bracket 123 and the top of the rear side wall 101C in the closed position assist in such securement.

As further depicted in FIGS. 2C-2G and 2I, the first rim member 250A may further define a projection 225 or other extension to which a user can grasp and pull the shelf frame 115 from the stowed position to the extended position and push back into the stowed position. The shape and location of the projection 225 and the hook 125 are not limited to the illustrated embodiments and can be any viable mechanism that produces the desired function of providing the user with an element to grasp and pull the shelf frame 115 from the stowed position to the extended position and push back into the stowed position. The projection 225 or other extension may allow the user to grasp and raise at least the first rim member 250A from the open position to the closed position, and vice versa. As with the embodiment depicted in FIGS. 1A-1M, the shelf bracket 123 of the embodiment depicted in FIGS. 2A-2K may be pivotably attached to the rear wall 119 of the shelf frame 115 such that it is configured to pivot upward from the generally horizontal base position. In an example use case, such pivoting may allow a user to pivot the shelf bracket 123 up, as depicted in at least FIGS. 2F, 2G, and 2I, and out of the way of a full waste bag when attempting to remove the waste bag from the shelf frame 115.

In some embodiments, a counterweight (not pictured) may extend from or be disposed in the rear of the body 110, at the base of the low-level waste receptacle 100, 200. Such a counterweight may be configured to help retain the low-level waste receptacle 100, 200 in a generally upright orientation when the shelf frame 115 is extended into the extended position. For example, in instances wherein the low-level waste receptacle 100, 200 is located in a contaminated area with contaminated floors, the use of wheels 117 (e.g., caster wheels) disposed on a bottom surface of the base 116 of the shelf frame 115 or the load-stabilizing brace 118 of the shelf frame 115 may be discouraged or prohibited in order to reduce or prevent contamination spread. In such instances, the counterweight may be included to prevent tipping of the low-level waste receptacle 100, 200.

In some embodiments, the body 110, access door(s) 120, lid(s) 130, shelf frame 115, rail(s) 145A, 145B, and/or any other portions of the low-level waste receptacle 100, 200 may be made of metal, plastic, or the like, or a combination thereof. For example, in some embodiments, the body 110 and/or shelf frame 115 may be stamped from sheet metal. In some embodiments, the body 110 and/or shelf frame 115 are formed of steel, aluminum, or the like, taking into consideration the weight of the low-level waste receptacle 100, 200. For example, the body 110 of the low-level waste receptacle 100, 200 may be aluminum having a mill finish (e.g., no coating), an anodized finish, a painted finish, and/or the like. In some embodiments, all or a portion of each access door 120 and/or lid 130 may be made from plastic (e.g., compression molded, blow molded, or injection molded). In some embodiments, the rest of the body 110 may be made from metal, plastic, or the like, or a combination thereof. For example, in some embodiments, a sheet metal body 110 is used.

Additionally or alternatively, the low-level waste receptacles 100, 200 may be color-coded or colored differently in order to assist with distinguishing between types of waste items to be disposed therein. For example, a low-level waste receptacle 100, 200 may be powder coated or painted in yellow to signal that low-level waste items may be disposed therein while a separate waste receptacle may be powder coated in green to signal that regular trash items may be disposed therein. Such a color coding system may reduce instances of cross-contamination and the requirement for segregating trash by assisting users to more easily identify the correct waste receptacle when holding potentially contaminating items to dispose.

Additionally or alternatively, in some embodiments, one or more rollers (not pictured) may be attached to the body 110 of the low-level waste receptacle 100, 200, to enable easier movement of the low-level waste receptacle 100, 200. For example, a roller wheel may be disposed at the bottom of and in each rear corner of the body 110, such that the body 110 may be tipped back and rolled to assist in moving the low-level waste receptacle 100, 200. Such roller wheel(s) may be in addition to or in place of legs 102 extending from the bottom of the body 110. In still further embodiments, one or more handles (not pictured) may be disposed on an exterior surface (e.g., outer surface of rear side wall 101C) of the body 110 to further assist in moving and/or steering the low-level waste receptacle 100, 200. Such handle and/or roller wheels may be crudely attached or formed as an integrated attachment of the low-level waste receptacle 100, 200.

Thus, particular embodiments of the subject matter have been described. While this specification contains many specific implementation details, these should not be construed as limitations on the scope of any embodiments or of what may be claimed, but rather as description of features specific to particular embodiments of the present disclosure. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Overview of Terms

The following explanations of terms are provided to better describe the present disclosure and to guide those of ordinary skill in the art in the practice of the present disclosure.

As used herein, relative terms such as "front," "rear," "top," "bottom", "lower," "upper," "above," "below," "right," and "left," etc. are used for explanatory purposes in the examples provided herein to refer to the orientation as then described or as shown in the drawing under discussion. These relative terms are for convenience of description and do not require that the apparatus be constructed or operated in a particular orientation.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the terms "illustrative," "example," "exemplary" and the like are used to mean "serving as an example, instance, or illustration" with no indication of quality level. Any implementation described herein as "exemplary" or "example" is not necessarily to be construed as preferred or advantageous over other implementations.

The terms "about," "approximately," "substantially," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

If the specification presents a list, unless stated otherwise, it is to be understood that each individual element of that list, and every combination of components of that list, is a separate embodiment. For example, "1, 2, 3, 4, and 5" encompasses, among numerous embodiments, 1; 2; 3; 1 and 2; 3 and 5; 1, 3, and 5; and 1, 2, 4, and 5.

It is understood that where a parameter range is provided, all integers and ranges within that range, and tenths and hundredths thereof, are also provided by the embodiments. For example, "5-10" includes 5, 6, 7, 8, 9, and 10; 5.0, 5.1, 5.2 . . . 9.8, 9.9, and 10.0; and 5.00, 5.01, 5.02 . . . 9.98, 9.99, and 10.00, as well as, for example, 6-9, 5.1-9.9, and 5.01-9.99.

The term "plurality" refers to two or more items.

The term "set" refers to a collection of one or more items.

The term "or" is used herein in both the alternative and conjunctive sense, unless otherwise indicated.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described herein. The materials, methods, and examples are illustrative only and not intended to be limiting, unless otherwise indicated. Other features of the disclosure are apparent from the detailed description and the claims.

While the present disclosure has been particularly described in conjunction with specific examples, it is evident that many alternatives, modifications, and variations will be apparent to those skilled in the art in light of the foregoing description. It is therefore contemplated that the appended claims will embrace any such alternatives, modifications, and variations as falling.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A low-level waste receptacle comprising:

a body, the body defining a plurality of side walls and an interior portion;

a lid configured to cover a first access opening of the body and permit selective access to the interior portion of the body;

a shelf frame disposed within the interior portion of body, wherein the shelf frame is configured for slidable extension relative to the body;

a shelf bracket extending from a rear wall of the shelf frame;

a bag-retaining frame pivotably attached to a rear side wall of the plurality of side walls of the body;

an access door configured to cover a second access opening of the body; and a foot pedal pivotably connected to the lid, wherein the rear wall of the shelf frame and the shelf bracket define a lower rim of a double-rimmed waste bag holder and the bag-retaining frame defines an upper rim of the double-rimmed waste bag holder, the double-rimmed waste bag holder configured to receive and retain a portion of a waste bag, wherein the bag-retaining frame is configured to be moveable throughout a range of motion between an open position and a closed position relative to the lower rim, wherein a bottom surface of the upper rim defined by the bag-retaining frame comprises a groove channel configured to receive a portion of the lower rim therein, and wherein, in the closed position, the bag-retaining frame is configured to retain the portion of the waste bag between the upper rim defined by the bag-retaining frame and the lower rim, wherein translation of the foot pedal from a first position to a second position is configured to translate the lid from a closed position to an open position relative to the first access opening of the body, and wherein the first position of the foot pedal is configured to prevent the access door from being opened.

2. A low-level waste receptacle comprising:

a body, the body defining a plurality of side walls and an interior portion;

a shelf frame disposed within the interior portion of body, wherein the shelf frame is configured for slidable extension relative to the body;

a shelf bracket extending from a rear wall of the shelf frame;

a bag-retaining frame pivotably attached to a rear side wall of the plurality of side walls of the body, wherein the rear wall of the shelf frame and the shelf bracket define a lower rim of a double-rimmed waste bag holder and the bag-retaining frame defines an upper rim of the double-rimmed waste bag holder, the double-rimmed waste bag holder configured to receive and retain a portion of a waste bag, wherein the bag-retaining frame is configured to be moveable throughout a range of motion between an open position and a closed position relative to the lower rim, wherein a bottom surface of the upper rim defined by the bag-retaining frame comprises a groove channel configured to receive a portion of the lower rim therein, and wherein, in the closed position, the bag-retaining frame is configured to retain the portion of the waste bag between the upper rim defined by the bag-retaining frame and the lower rim.

3. The low-level waste receptacle of claim 2, wherein the shelf frame is configured to slidingly move throughout a range of motion between a stowed position within the interior portion of the body and an extended position.

4. The low-level waste receptacle of claim 3, wherein the shelf frame includes a track slide extending along each of an exterior left surface and an exterior right surface of the shelf frame, and wherein an inner surface of each of a left side wall and a right side wall of the body include a complementary guide rail engaged with the respective track slides of the shelf frame.

5. The low-level waste receptacle of claim 4, wherein the track slides are telescoping track slides.

6. The low-level waste receptacle of claim 2, wherein the shelf frame comprises a load-stabilizing bracket extending from underneath a base of the shelf frame and wherein one or more caster wheels are coupled to the load-stabilizing bracket.

7. The low-level waste receptacle of claim 2, further comprising a foot pedal, the foot pedal pivotably connected to a lid, wherein the lid is configured to cover a first access opening of the body and permit selective access to the interior portion of the body.

8. The low-level waste receptacle of claim 7, wherein the lid is hingedly connected to the rear side wall of the body.

9. The low-level waste receptacle of claim 7, wherein the foot pedal is configured to limit sliding of the shelf frame and prevent a rear of the shelf frame from sliding past a front plane of the body.

10. The low-level waste receptacle of claim 2, further comprising a counterweight disposed in a rear of the body.

11. The low-level waste receptacle of claim 2, wherein the shelf frame comprises a base, the rear wall attached to and extending from the base of the shelf frame, wherein the base extends between a left side wall and a right side wall of the body, and wherein the base is disposed closer to a bottom portion of the body than a top portion of the body.

12. The low-level waste receptacle of claim 2, wherein the shelf bracket is pivotably attached to the rear wall of the shelf frame.

13. The low-level waste receptacle of claim 2, further comprising a visual indicator attached to an exterior of the body, the visual indicator configured to visually indicate waste bag replacement requirements.

14. The low-level waste receptacle of claim 2, the shelf bracket further defining a hook extension.

15. The low-level waste receptacle of claim 2, the bag-retaining frame further defining an upper rim handle.

16. The low-level waste receptacle of claim 15, wherein the upper rim handle is disposed on a front portion of the bag-retaining frame, the front portion of the bag-retaining frame disposed opposite of the rear side wall of the body.

17. The low-level waste receptacle of claim 2, wherein the plurality of side walls of the body comprises the rear side wall, a right side wall, and a left side wall disposed opposite the right side wall.

18. The low-level waste receptacle of claim 2, further comprising one or more legs extending from an underside of the body.

19. The low-level waste receptacle of claim 4, wherein the track slides are roller-bearing slides.

20. The low-level waste receptacle of claim 6, wherein the load-stabilizing bracket is structured to support a weight of the waste bag while the shelf frame is in an extended position relative to the body.

* * * * *